US012812416B2

(12) United States Patent
Bae et al.

(10) Patent No.: US 12,812,416 B2
(45) Date of Patent: Nov. 24, 2026

(54) ELECTRONIC DEVICE SUPPORTING MULTIPLE SIMS AND METHOD FOR OPERATING THE SAME

(71) Applicant: Samsung Electronics Co., Ltd., Suwon-si (KR)

(72) Inventors: Janggun Bae, Suwon-si (KR); Inshik Kang, Suwon-si (KR); Sukkyung Yoon, Suwon-si (KR); Kyoungho Lee, Suwon-si (KR); Yunbeom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 18/631,628

(22) Filed: Apr. 10, 2024

(65) Prior Publication Data

US 2024/0349091 A1 Oct. 17, 2024

Related U.S. Application Data

(63) Continuation of application No. PCT/KR2024/004177, filed on Apr. 1, 2024.

(30) Foreign Application Priority Data

Apr. 17, 2023 (KR) ........................ 10-2023-0050105
May 16, 2023 (KR) ........................ 10-2023-0063156

(51) Int. Cl.
*H04W 24/04* (2009.01)
*H04W 72/51* (2023.01)
*H04W 88/06* (2009.01)

(52) U.S. Cl.
CPC .......... *H04W 24/04* (2013.01); *H04W 72/51* (2023.01); *H04W 88/06* (2013.01)

(58) Field of Classification Search
CPC ..... H04W 24/04; H04W 72/51; H04W 76/19; H04W 88/06; H04W 8/183; H04W 48/16
See application file for complete search history.

(56) References Cited

U.S. PATENT DOCUMENTS

2013/0189985 A1 7/2013 Mutya
2014/0024353 A1 1/2014 Baek
(Continued)

FOREIGN PATENT DOCUMENTS

KR 20000032680 A 6/2000
KR 20140011771 A 1/2014
(Continued)

OTHER PUBLICATIONS

Search Report and Written Opinion dated Jun. 24, 2024 issued in International Patent Application No. PCT/KR2024/004177.
(Continued)

*Primary Examiner* — William G Trost, IV
(74) *Attorney, Agent, or Firm* — Nixon & Vanderhye P.C.

(57) ABSTRACT

According to an embodiment, an electronic device may comprise memory and at least one processor, comprising processing circuitry. The memory may store at least one instruction that, when executed by at least one processor, individually and/or collectively, causes the electronic device to: perform a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identify a service failure in the second network communication corresponding to the second SIM while performing the call service based on the first
(Continued)

network communication based on the first SIM; based on the service failure, perform a scan for the second network communication corresponding to the second SIM one or more times; and perform at least one operation for restricting the scan for the second network communication based on a cell for the second network communication not being identified as a result of the scan one or more times.

20 Claims, 15 Drawing Sheets

(56) References Cited

U.S. PATENT DOCUMENTS

| | | | | |
|---|---|---|---|---|
| 2014/0274006 | A1* | 9/2014 | Mutya | H04W 4/16 455/416 |
| 2015/0099516 | A1 | 4/2015 | Nayak | |
| 2016/0366270 | A1 | 12/2016 | He | |
| 2021/0368327 | A1* | 11/2021 | Gao | H04W 24/08 |
| 2022/0104103 | A1 | 3/2022 | Lee et al. | |
| 2022/0150815 | A1* | 5/2022 | Korneluk | G01S 19/34 |
| 2022/0240340 | A1* | 7/2022 | Xu | H04W 24/08 |
| 2023/0010736 | A1* | 1/2023 | Hebein | H04W 76/15 |
| 2023/0308855 | A1* | 9/2023 | Matolia | H04W 8/183 |
| 2024/0422525 | A1* | 12/2024 | Selvaganapathy | H04W 36/142 |

FOREIGN PATENT DOCUMENTS

| | | |
|---|---|---|
| KR | 10-2022-0041662 | 4/2022 |
| KR | 10-2022-0105314 | 7/2022 |
| WO | 2015/038237 | 3/2015 |

OTHER PUBLICATIONS

Mediatek Inc., "Discussion on R18 MUSIM Scenarios", GPP TSG-RAN WG2 #119bis-e, R2-2210503, Oct. 10-19, 2022, 2 pages.

Nokia et al., "UE Architecture, Assumptions, and Primary scenarios for Dual TX/RX MUSIM operation", R2-2210070, 3GPP TSG-RAN WG2 Meeting #119bis-Electronic, Oct. 10-19, 2022, 4 pages.

* cited by examiner

ELECTRONIC DEVICE SUPPORTING MULTIPLE SIMS AND METHOD FOR OPERATING THE SAME

CROSS-REFERENCE TO RELATED APPLICATIONS

This application is a continuation of International Application No. PCT/KR2024/004177 designating the United States, filed on Apr. 1, 2024, in the Korean Intellectual Property Receiving Office and claiming priority to Korean Patent Application Nos. 10-2023-0050105, filed on Apr. 17, 2023, and 10-2023-0063156, filed on May 16, 2023, in the Korean Intellectual Property Office, the disclosures of each of which are incorporated by reference herein in their entireties.

BACKGROUND

Field

The disclosure relates to an electronic device supporting a plurality of SIMs and a method for operating the same.

Description of Related Art

In a wireless communication system, an electronic device (e.g., user equipment (UE)) may access a wireless communication network and use a voice communication or data communication service in a fixed position or on the move. To provide a communication service to an electronic device, an appropriate authentication process is required. A universal integrated circuit card (UICC) is inserted into the electronic device, and authentication is performed between the electronic device and the server of the mobile network operator (MNO) through a universal subscriber identity module (USIM) installed in the UICC. UICC may be called subscriber identity module (SIM) in the case of global system for mobile communications (GSM) and universal subscriber identity module (USIM) in the case of wideband code division multiple access (WCDMA), and long term evolution (LTE). The USIM card or SIM card may be provided as a standalone UICC or may be embedded (e.g., embedded SIM, eSIM) in the electronic device or may be integrated into at least one chip included in the electronic device (e.g., integrated SIM, iSIM).

If the user of the electronic device subscribes to a wireless communication service provided by the mobile network operator, the mobile network operator may provide a UICC (e.g., a SIM card or a USIM card) to the user. The user may insert the provided UICC into her electronic device. According to an embodiment, when the user of the electronic device subscribes to the wireless communication service provided by the mobile network operator, the user may receive information to be stored in the UICC (e.g., eSIM card or iSIM card) included in the electronic device from the mobile network operator. If the UICC is inserted into the electronic device or the information to be stored in the UICC is received from the mobile network operator, the USIM application installed in the UICC may perform an appropriate authentication process with the mobile network operator's server, which stores the same value, using to the international mobile subscriber identity (IMSI) value stored in the UICC and the encryption key value for authentication. After the appropriate authentication process is performed, the wireless communication service may be used.

When information related to the SIM is provided to the UICC (e.g., eSIM or iSIM) installed in the electronic device from the server of the mobile network operator, an appropriate authentication process may be performed with the mobile network operator's server that stores the same value using an encryption key value for authentication and the international mobile subscriber identity (IMSI) value that may be generated through information related to the SIM or included in the SIM-related information. After the appropriate authentication process is performed, the wireless communication service may be used.

The electronic device may support two or more SIMs, which may be referred to as a dual-SIM or multi-SIM electronic device. Mounting two or more SIM cards in an electronic device may mean that at least two or more independent UICCs are configured. Or, mounting two or more SIM cards in an electronic device may mean that at least one or more independent UICCs and at least one or more eSIM cards are configured. Or, mounting two or more SIM cards in an electronic device may mean that at least one or more independent UICCs and at least one or more iSIM card are configured. Or, mounting two or more SIM cards in an electronic device may mean that an eSIM card or iSIM card supporting at least two or more networks is configured. A dual-SIM or multi-SIM electronic device may support multiple SIMs, and each SIM may be associated with a different subscription. A mode in which one transceiver transmits and receives signals associated with a plurality of SIMs may be referred to as a dual-SIM dual-standby (DSDS) state. In this case, if one SIM transmits or receives a signal, the other SIM may be in the standby mode. Or, a mode capable of simultaneous activation of both the SIMs may be referred to as a dual-SIM dual-active (DSDA) state.

SUMMARY

According to an embodiment, an electronic device may comprise: memory and at least one processor comprising processing circuitry, wherein, the memory may store at least one instruction that, when executed by at least one processor, individually and/or collectively, causes the electronic device to: perform a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identify a service failure in the second network communication corresponding to the second SIM while performing the call service based on the first network communication based on the first SIM; based on the service failure, perform a scan for the second network communication corresponding to the second SIM one or more times; and perform at least one operation for restricting the scan for the second network communication based on a cell for the second network communication not being identified as a result of the scan one or more times.

According to an embodiment, in a non-transitory computer-readable storage medium storing at least one computer-readable instruction, the at least one instruction, when executed by at least one processor, individually and/or collectively, of an electronic device, may cause the electronic device to perform at least one operation comprising: performing a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identifying a service failure in the second network communication corresponding to the second SIM while performing the call service based on the first network communication based on the first SIM; based on the service failure, performing a scan for the second network communication corresponding to the second SIM one or more times; and performing at least one operation for restricting the scan for the second network communication based on a cell for the second network communication not being identified as a result of the scan one or more times.

According to an embodiment, a method for operating an electronic device may comprise: performing a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identifying a service failure in the second network communication corresponding to the second SIM while performing the call service based on the first network communication based on the first SIM; based on the service failure, performing a scan for the second network communication corresponding to the second SIM one or more times; and performing at least one operation for restricting the scan for the second network communication based on a cell for the second network communication not being identified as a result of the scan one or more times.

According to an embodiment, an electronic device may comprise: memory and at least one processor comprising processing circuitry, wherein the memory may store at least one instruction that, when executed by at least one processor, individually and/or collectively, may cause the electronic device to: perform a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identify a service failure in the second network communication corresponding to the second SIM while performing the call service based on the first network communication based on the first SIM; based on the service failure, perform a scan for the second network communication corresponding to the second SIM one or more times; and enter a dual-SIM dual-standby (DSDS) state of allocating a third portion of RF resources of the electronic device for the first network communication and the second network communication based on a cell for the second network communication not being identified as a result of the scan one or more times.

According to an embodiment, in a non-transitory computer-readable storage medium storing at least one computer-readable instruction, the at least one instruction, when executed by at least one processor, comprising processing circuitry, individually and/or collectively, of an electronic device, may cause the electronic device to perform at least one operation, comprising: performing a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identifying a service failure in the second network communication corresponding to the second SIM while performing the call service based on the first network communication based on the first SIM; based on the service failure, performing a scan for the second network communication corresponding to the second SIM one or more times; and entering a dual-SIM dual-standby (DSDS) state of allocating a third portion of RF resources of the electronic device for the first network communication and the second network communication based on a cell for the second network communication not being identified as a result of the scan one or more times.

According to an embodiment, a method for operating an electronic device may comprise: performing a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identifying a service failure in the second network communication corresponding to the second SIM while performing the call service based on the first network communication based on the first SIM; based on the service failure, performing a scan for the second network communication corresponding to the second SIM one or more times; and entering a dual-SIM dual-standby (DSDS) state of allocating a third portion of RF resources of the electronic device for the first network communication and the second network communication based on a cell for the second network communication not being identified as a result of the scan one or more times.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
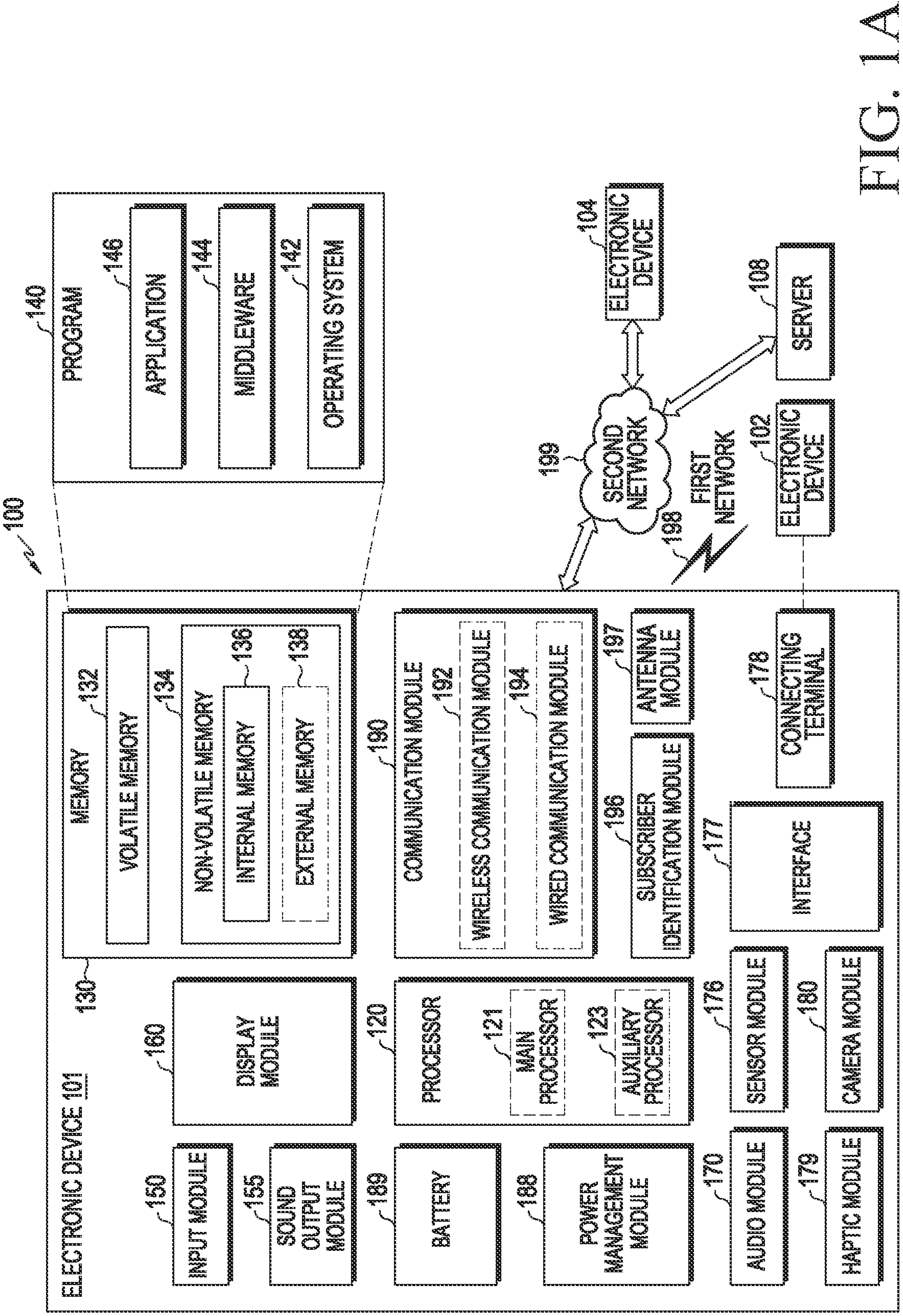
FIG. 1A is a block diagram illustrating an electronic device in a network environment according to various embodiments.

FIG. 1A is a block diagram illustrating an electronic device 101 in a network environment 100 according to an embodiment. Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 1B:
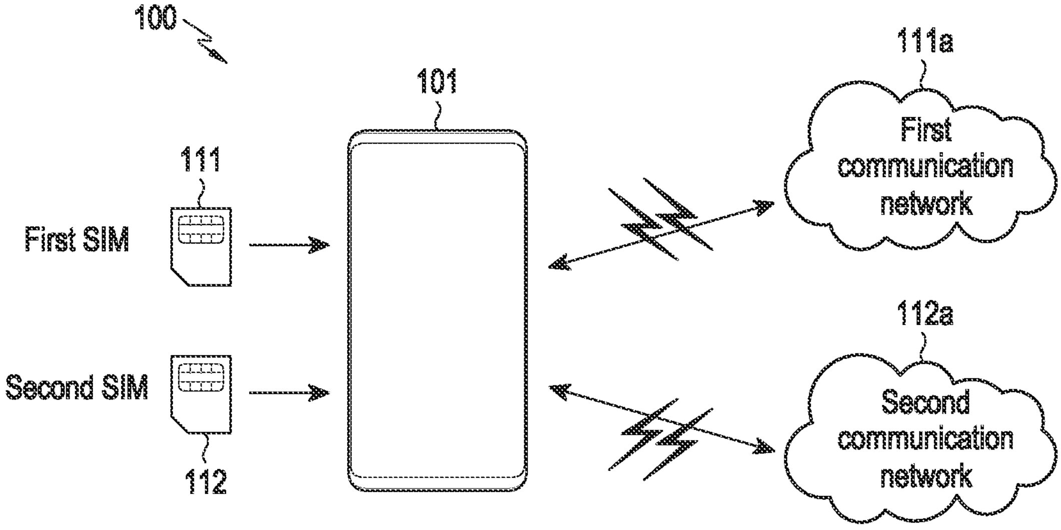
FIG. 1B is a view illustrating a network environment including an electronic device according to various embodiments.

FIG. 1B is a view illustrating a network environment 100 including an electronic device according to various embodiments. Referring to FIG. 1B, according to various embodiments of the present disclosure, a network 100 may include an electronic device 101, a first communication network 111*a*, a second communication network 112*a*, or a third communication network.

According to various embodiments, the electronic device 101 may operate in a dual SIM dual standby (DSDS) mode supporting a plurality of SIMs in one device. For example, the electronic device 101 may be equipped with two SIMs, e.g., a first SIM 111 and/or a second SIM 112. The first SIM 111 and the second SIM 112 may be removable SIMs (rSIMs). The rSIM may be a SIM detachable from a slot provided in the electronic device 101 and its form/specifications are not limited to specific ones. For example, the electronic device 101 may be equipped with two SIM cards to support the two SIMs. According to an embodiment, for convenience of description, the first SIM 111 and the second SIM 112 are shown as SIM cards, but are not limited thereto. The electronic device 101 may include an embedded SIM (eSIM) 191. For example, the electronic device 101 may be implemented to include only the eSIM 191, and the eSIM 191 may activate a plurality of profiles. In this case, a dual SIM-based operation based on the plurality of profiles may be performed. The electronic device 101 may be implemented to include the eSIM 191 and a slot for mounting one or more SIMs. In this case, the electronic device 101 may perform the dual SIM-based operation based on information stored in an rSIM inserted (or connected) in the slot and the profile activated by the eSIM 191. The electronic device 101 may perform dual SIM-based operations based on two rSIMs, and the combination is not limited. For example, at least one of the first SIM 111 or the second SIM 112 may be replaced with an eSIM or an integrated SIM (iSIM). In this case, at least part of the information stored in the rSIM may be replaced by information about the profile activated by the eSIM. Hereinafter, for convenience of description, the SIM card will be referred to as a SIM. As illustrated in FIG. 1B, two SIM cards, the first SIM 111 and the second SIM 112, may be mounted in the electronic device 101. The electronic device 101 may include a first slot (not shown) and a second slot (not shown), which are first structures, to receive the first SIM 111 and the second SIM 112, respectively.

For example, the first SIM 111 may be a SIM which has subscription to the mobile network operator of the first communication network 111*a*. The electronic device 101 may access the first communication network 111*a* using the first SIM 111 to receive the wireless communication service. The second SIM 112 may be a SIM which has subscription to the mobile network operator of the second communication network 112*a*. The electronic device 101 may access the second communication network 112*a* using the second SIM 112 to receive the wireless communication service. The first communication network 111*a* and the second communication network 112*a* may be provided by the same communication carrier or may be provided by different communication carriers, separately. When the first communication network 111*a* and the second communication network 112*a* are provided by the same mobile network operator, the first communication network 111*a* and the second communication network 112*a* may mean the same network. Or, different operators may share a communication network. For example, a first mobile network operator may use the first communication network 111*a*, and a second mobile network operator may be configured to also use the second communication network 112*a*. According to an embodiment, although not shown, one of ordinary skill in the art will easily understand that the electronic device 101 may further include at least one additional SIM, and the number or type of SIMs is not limited.

Figure 2A:
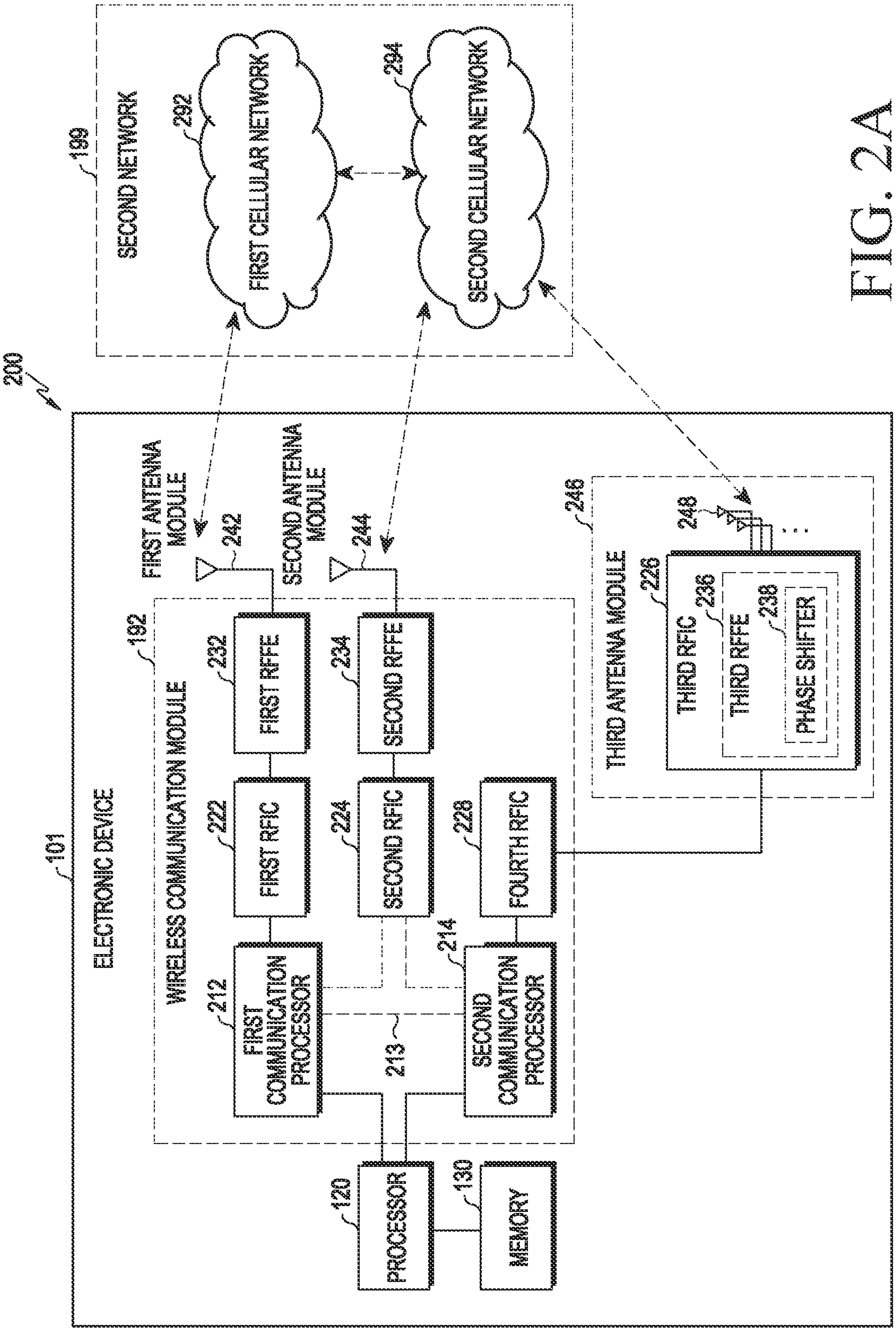
FIG. 2A is a block diagram illustrating an electronic device for supporting legacy network communication and 5G network communication according to an embodiment.

FIG. 2A is a block diagram 200 illustrating an electronic device 101 for supporting legacy network communication and 5G network communication according to an embodiment. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module (e.g., including at least one antenna) 242, a second antenna module (e.g., including at least one antenna) 244, a third antenna module (e.g., including at least one antenna) 246, and antennas 248. The electronic device 101 may further include a processor (e.g., including processing circuitry) 120 and memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first communication processor 212 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The first communication processor 212 may, for example, establish a communication channel of a band that is to be used for wireless communication with the first cellular network 292 or may support legacy network communication via the established communication channel. According to an embodiment, the first cellular network may be a legacy network that includes second generation (2G), third generation (3G), fourth generation (4G), or long-term evolution (LTE) networks. The second communication processor 214 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The second communication processor 214 may, for example, establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first communication processor 212 or the second communication processor 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various types of information, such as sensing information, information about output strength, and resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
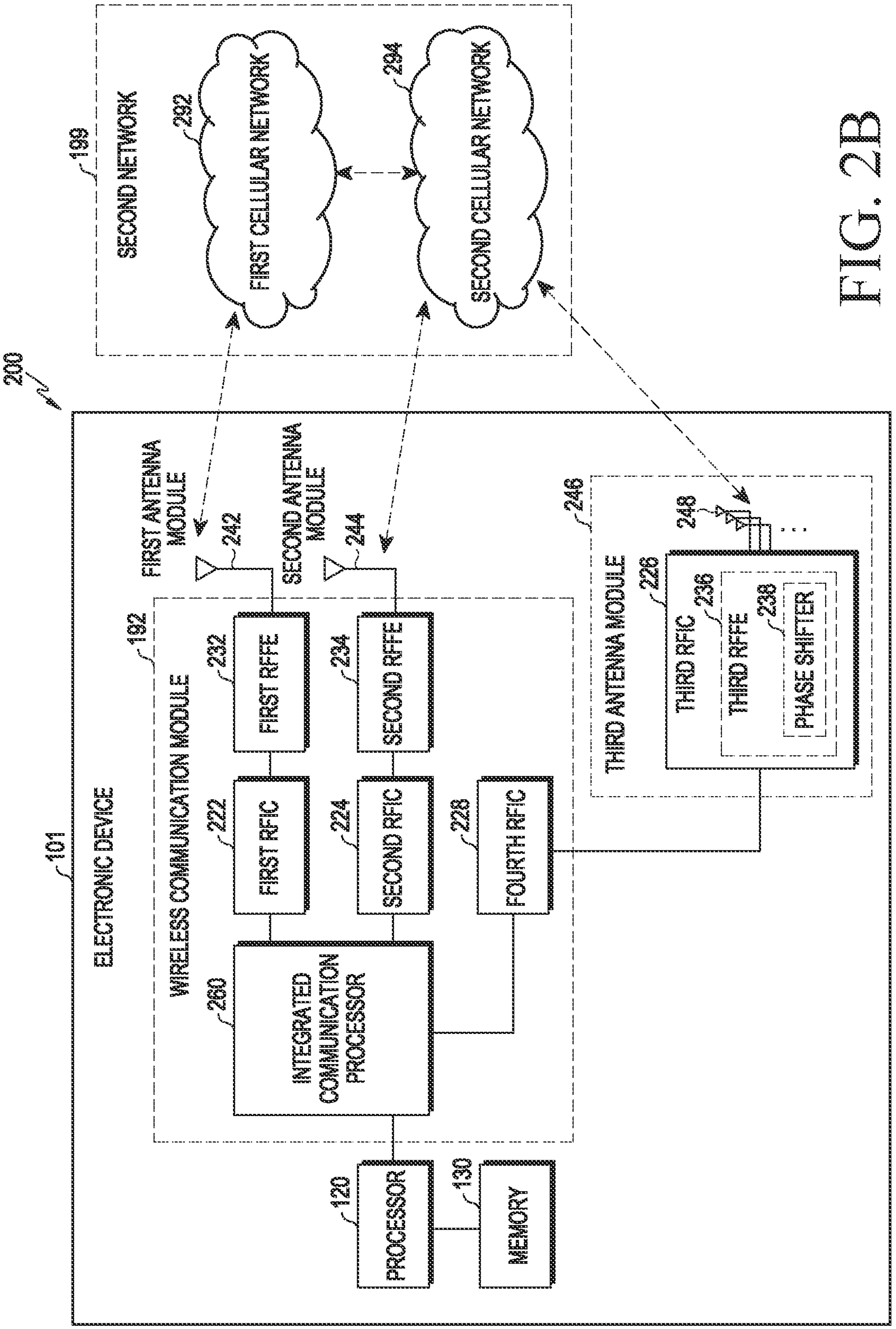
FIG. 2B is a block diagram illustrating an electronic device for supporting legacy network communication and 5G network communication according to an embodiment.

According to an embodiment, the first communication processor 212 and the second communication processor 214 may be implemented in a single chip or a single package. According to an embodiment, the first CP 212 or the second CP 214, along with the processor 120, an assistance processor 123, or communication module 190, may be formed in a single chip or single package. For example, as shown in FIG. 2B, an integrated communication processor 260 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The integrated communication processor 260 may, for example, support all of the functions for communication with the first cellular network 292 and the second cellular network 294.

As described above, at least one of the processor 120, the first communication processor 212, the second communication processor 214, or the integrated communication processor 260 may be implemented as a single chip or a single package. In this case, the single chip or single package may include memory (or storage means) storing instructions that cause at least some of operations performed according to an embodiment and a processing circuit (or operation circuit, but the term is not limited) for executing instructions.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second CP 214 into a 5G Above6 band (e.g., from about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHZ) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to an embodiment, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHZ) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may have the access network (e.g., 5G radio access network (RAN) or next generation RAN (NG RAN)) but may not have the core network (e.g., next generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3A:
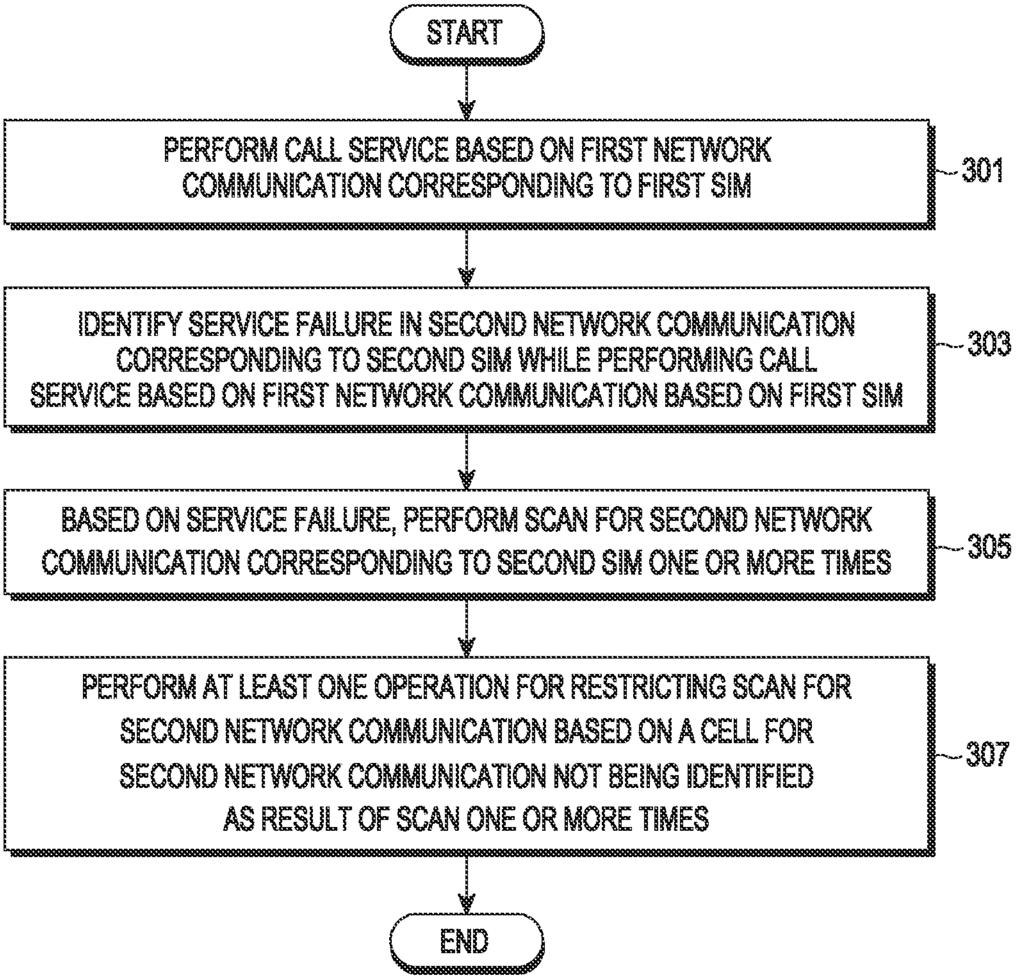
FIG. 3A is a flowchart illustrating an operation method of an electronic device according to an embodiment.

FIG. 3A is a flowchart illustrating an operation method of an electronic device according to an embodiment.

According to an embodiment, in operation 301, the electronic device 101 (e.g., at least one of the processor 120, the first communication processor 212, the second communication processor 214, or the integrated communication processor 260) may perform a call service based on a first network communication corresponding to a first SIM 111 in a state in which a first portion, which is at least a portion of RF resources (e.g., at least some of the first RFIC 222, the second RFIC 224, the third RFIC 226, the fourth RFIC 228, the first RFFE 232, the second RFFE 234, the third RFFE 236, or antenna modules 242, 244, and 248) of the electronic device 101 is allocated for the first network communication corresponding to the first SIM 111, and a second portion which is at least a portion of the RF resources is allocated for a second network communication corresponding to a second SIM 112 different from the first SIM 111. The first portion and the second portion may be at least partially different, e.g., the first portion may be referred to as a first RF path, and the second portion may be referred to as a second RF path. Based on different RF paths, the first network communication corresponding to the first SIM 111 and the second network communication corresponding to the second SIM 112 may be performed (e.g., transmit an RF signal) at least partially simultaneously in the DSDA state. The first RF path and the second RF path may be set based on, e.g., different power amplifiers (PAs). Meanwhile, in the DSDS state, the same RF resources (or the same RF path) may be allocated to the first SIM 111 and the second SIM 112. In the DSDS state, the communication associated with the first SIM 111 and the communication associated with the second SIM 112 may time-divisionally use the corresponding RF resources (or the corresponding RF path). Meanwhile, the RF resources (or the corresponding RF path) allocated to the first SIM 111 and the second SIM 112 described above may be the same, or may be at least partially different, but even in this case, the first SIM 111 and the second SIM 112 may share one PA.

For example, the electronic device 101 may simultaneously perform at least part of the first network communication corresponding to the first SIM 111 and the second network communication corresponding to the second SIM 112, and for convenience of description, this may be expressed as the electronic device 101 operating in the DSDA state. For example, in the DSDA states of the first SIM 111 and the second SIM 112, the electronic device 101 may perform a call service based on the first network communication corresponding to the first SIM 111. Here, the call service may include, e.g., an IP-based call service (e.g., VoNR, VOLTE), a circuit switching (CS)-based call service, and/or a data-based call service using an application providing a call function, but is not limited thereto. When the call service based on the first network communication is performed, the electronic device 101 may perform data communication based on the second network communication, but is not limited thereto.

According to an embodiment, in operation 303, the electronic device 101 may identify a service failure in the second network communication corresponding to the second SIM 112 while the call service based on the first network communication based on the first SIM 111 is being performed. It will be understood by those skilled in the art that the service failure may be expressed as disconnection (e.g., RRC release but not limited), radio link failure (RLF), out of service (OOS), and/or no-service (NoSVC), the type of service failure is not limited, and the method for identifying the service failure is not limited. In operation 305, the electronic device 101 may perform a scan for the second network communication corresponding to the second SIM 112 one or more times, based on the service failure in the second network communication. For example, the electronic device 101 may perform at least some of a scan based on stored information (e.g., also referred to as a stored scan), a full scan, and/or a recovery scan, and there is no limitation on the type and/or number of scans performed based on a service failure.

According to an embodiment, in operation 307, the electronic device 101 may perform at least one operation for restricting the scan for the second network communication, based on a cell for the second network communication not being identified as a result of the scan one or more times. For example, when an event of resuming the scan is detected while not performing the scan, the electronic device 101 may perform a method for performing the scan as the operation for restricting the scan. For example, the electronic device 101 may perform a method for adjusting the scan period to be relatively long as the operation for restricting the scan. For example, the electronic device 101 may perform a method for performing only a portion of all scan methods (e.g., performing only scan based on stored information) as the operation for restricting the scan. The above-described operations for restricting the scan are merely examples and are not limited.

For example, in operation 307, the electronic device 101 may identify whether a cell based on the RAT supporting the DSDA state of the first SIM 111 and the second SIM 112 is identified (or detected) as a result of a scan one or more times. For example, a combination of RATs of multiple SIMs supporting the DSDA state may be shown in Table 1.

TABLE 1

| | | Second SIM 112 (e.g., non DDS) | |
|---|---|---|---|
| | | LTE | Sub6 SA |
| First SIM 111 (e.g., DDS, default data service) | LTE | supports DSDS | supports both DSDS and DSDA |
| | Sub6 SA | support both DSDS and DSDA | supports both DSDS and DSDA |

For example, when the first network communication corresponding to the first SIM 111 is LTE and the second network communication corresponding to the second SIM 112 is Sub6 SA, the electronic device 101 may operate in the DSDS state but may not operate in the DSDA state. For example, in the DSDA state, different TX paths may be required, and the DSDA state for the LTE/LTE combination may not operate depending on the implementation of the electronic device 101. Meanwhile, this is exemplary, and it will be understood by one of ordinary skill in the art that the electronic device 101 may be implemented to support DSDA even for LTE/LTE combination. For example, it is assumed that both the DSDS state and the DSDA state may be supported for the LTE/Sub6 SA combination, the Sub6 SA/LTE combination, and the Sub6 SA/Sub6 SA combination. For example, when the first network communication corresponding to the first SIM 111 is LTE, if a cell based on LTE is detected as a result of a scan corresponding to the second SIM 112, the electronic device 101 may identify that the cell based on the RAT supporting the DSDA state is not identified (or detected). For example, when the first network communication corresponding to the first SIM 111 is LTE, if a cell based on Sub6 SA is detected as a result of a scan corresponding to the second SIM 112, the electronic device 101 may identify that the cell based on the RAT supporting the DSDA state is identified (or detected).

Even when a cell according to a scan is not identified (or detected) in the second network communication, unnecessary power consumption may occur when a general scan is continuously performed. For example, when a call service is performed based on the first network communication, the call service may need to occupy all of the corresponding RF resources (or RF paths) in time series. This may mean that when the call service is performed, the DSDA state may not be supported. Accordingly, even if a cell based on the RAT for the DSDA state is identified as a result of a scan for the second SIM 112, the DSDA state may not be supported, and thus access to the corresponding cell may not be possible. If the cell based on the RAT for the DSDA state is not identified, the scan for detecting the cell may cause unnecessary power consumption. For example, based on Table 1, when a call service is performed based on LTE corresponding to the first SIM 111, a service failure for sub6 SA corresponding to the second SIM 112 may be identified. In this case, even if the electronic device 101 detects the cell of LTE in association with the second SIM 112, since the LTE/LTE combination does not support the DSDA state, the scan for detecting the cell of LTE may not be beneficial. Further, when cell detection for sub6 SA fails in association with the second SIM 112, there is a possibility that the failure may be maintained, and thus power consumption may be reduced by restricting the scan. As described above, if a failure based on network communication corresponding to another SIM is identified while a call service based on network communication corresponding to any one SIM is performed, the operation for restricting a scan is performed, reducing unnecessary power consumption.

Figure 3B:
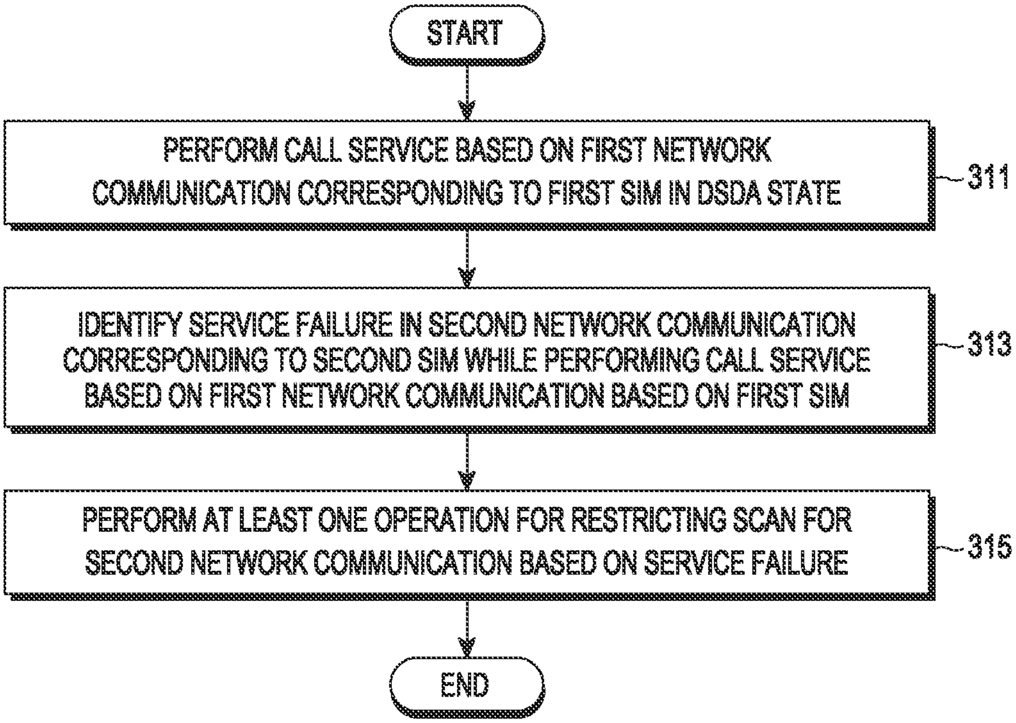
FIG. 3B is a flowchart illustrating an operation method of an electronic device according to an embodiment.

FIG. 3B is a flowchart illustrating an operation method of an electronic device according to an embodiment.

According to an embodiment, in operation 311, the electronic device 101 (e.g., at least one of the processor 120, the first communication processor 212, the second communication processor 214, or the integrated communication processor 260) may perform a call service based on a first network communication corresponding to a first SIM 111 in a DSDA state in which at least a portion of RF resources of the electronic device 101 is allocated for the first network communication corresponding to the first SIM 111, and at least a portion of the RF resources is allocated for a second network communication corresponding to a second SIM 112 different from the first SIM 111.

In operation 313, the electronic device 101 may identify a service failure in the second network communication corresponding to the second SIM 112 while the call service based on the first network communication based on the first SIM 111 is being performed.

In operation 315, the electronic device 101 may perform at least one operation for restricting the scan for the second network communication, based on identifying the service failure in the second network communication. For example, when an event of resuming the scan is detected while not performing the scan, the electronic device 101 may perform a method for performing the scan as the operation for restricting the scan. For example, the electronic device 101 may perform a method for adjusting the scan period to be relatively long as the operation for restricting the scan. For example, the electronic device 101 may perform a method for performing only a portion of all scan methods (e.g., performing only scan based on stored information) as the operation for restricting the scan. The above-described operations for restricting the scan are exemplary and are not limited. In the embodiment of FIG. 3B, the electronic device 101 may perform an operation for restricting a scan based on identifying a service failure based on the second network communication while performing a call service based on the first network communication, and thus unnecessary power consumption may be reduced. For example, the electronic device 101 may restrict the scan based on meeting at least one additional condition (e.g., a condition in which the battery capacity is equal to or less than a designated threshold capacity or a condition in which the temperature is equal to or greater than a threshold temperature, but there is no limitation) for identifying a service failure and restricting the scan. Whether at least one additional condition for scan restriction is met may be identified, e.g., after the service failure is identified, but there is no limitation on the time of identification, and it may be identified even before the service failure is identified.

Figure 4:
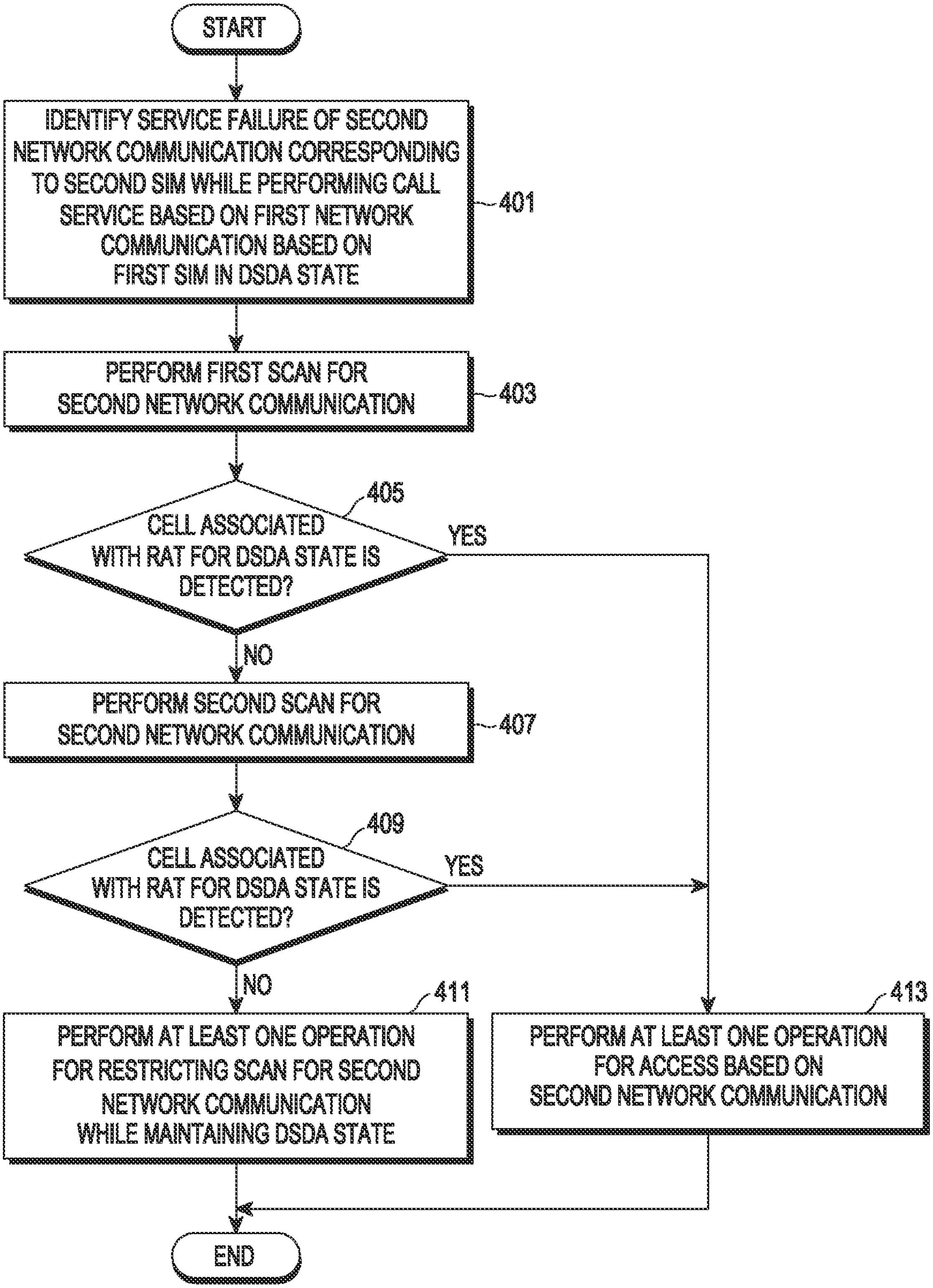
FIG. 4 is a flowchart illustrating an operation method of an electronic device according to an embodiment.

FIG. 4 is a flowchart illustrating an operation method of an electronic device according to an embodiment.

According to an embodiment, in operation 401, the electronic device 101 (e.g., at least one of the processor 120, the first communication processor 212, the second communication processor 214, or the integrated communication processor 260) may identify a service failure in the second network communication corresponding to the second SIM 112 while a call service based on the first network communication based on the first SIM 111 is performed in the DSDA state. Since the service failure identification method has been described above, and may not be repeated here.

In operation 403, the electronic device 101 may perform a first scan for the second network communication, based on identifying a service failure in the second network communication corresponding to the second SIM 112. For example, the first scan may be, e.g., a recovery scan, but is not limited thereto. For example, the first scan may include at least one of a recovery scan, a scan based on stored information, or a full scan, but the type thereof is not limited thereto.

According to an embodiment, in operation 405, the electronic device 101 may identify whether a cell associated with the RAT for the DSDA state is detected based on the first scan. For example, the electronic device 101 may identify whether a cell associated with the RAT for the DSDA state is detected based on the first scan, based on information about whether the DSDS state and/or the DSDA state is supported for a combination of RATs of a plurality of SIMs as shown in Table 1, but the method is not limited thereto. When a cell associated with the RAT for the DSDA state based on the first scan is detected (Yes in operation 405), the electronic device 101 may perform at least one operation for accessing based on the second network communication in operation 413. For example, the electronic device 101 may perform at least some of an operation for camping on the identified cell, an operation for random access, an operation for RRC connection, and/or an operation for registration to the core network as at least one operation for access, but the type thereof is not limited thereto.

According to an embodiment, when the cell associated with the RAT for the DSDA state based on the first scan is not detected (No in operation 405), the electronic device 101 may perform the second scan for the second network communication in operation 407. For example, the second scan may be, e.g., a scan based on stored information and a full scan, but is not limited thereto. For example, the second scan may include at least one of a recovery scan, a scan based on stored information, or a full scan, but the type thereof is not limited thereto.

In operation 409, the electronic device 101 may identify whether a cell associated with the RAT for the DSDA state is detected based on the second scan. For example, the electronic device 101 may identify whether a cell associated with the RAT for the DSDA state is detected based on the second scan, based on information about whether the DSDS state and/or the DSDA state is supported for a combination of RATs of a plurality of SIMs as shown in Table 1, but the method is not limited thereto. When a cell associated with the RAT for the DSDA state based on the second scan is detected (Yes in operation 409), the electronic device 101 may perform at least one operation for accessing based on the second network communication in operation 413. For example, the electronic device 101 may perform at least some of an operation for camping on the identified cell, an operation for random access, an operation for RRC connection, and/or an operation for registration to the core network as at least one operation for access, but the type thereof is not limited thereto. When the cell associated with the RAT for the DSDA state based on the second scan is not detected (No in operation 409), the electronic device 101 may perform at least one operation for restricting the scan for the second network communication while maintaining the DSDA state in operation 411. For example, the electronic device 101 may maintain allocation of different RF resources capable of at least partially simultaneous operation to the first network communication and the second network communication according to the DSDA state, and may perform at least one operation for restricting scan for the second network communication. When the cell supporting the DSDA state is not detected according to the result of the multiple scans based on the identification of the service failure based on the second network communication while performing the call service based on the first network communication, the electronic device 101 may perform an operation for restricting the scan, and thus unnecessary power consumption may be reduced.

Figure 5:
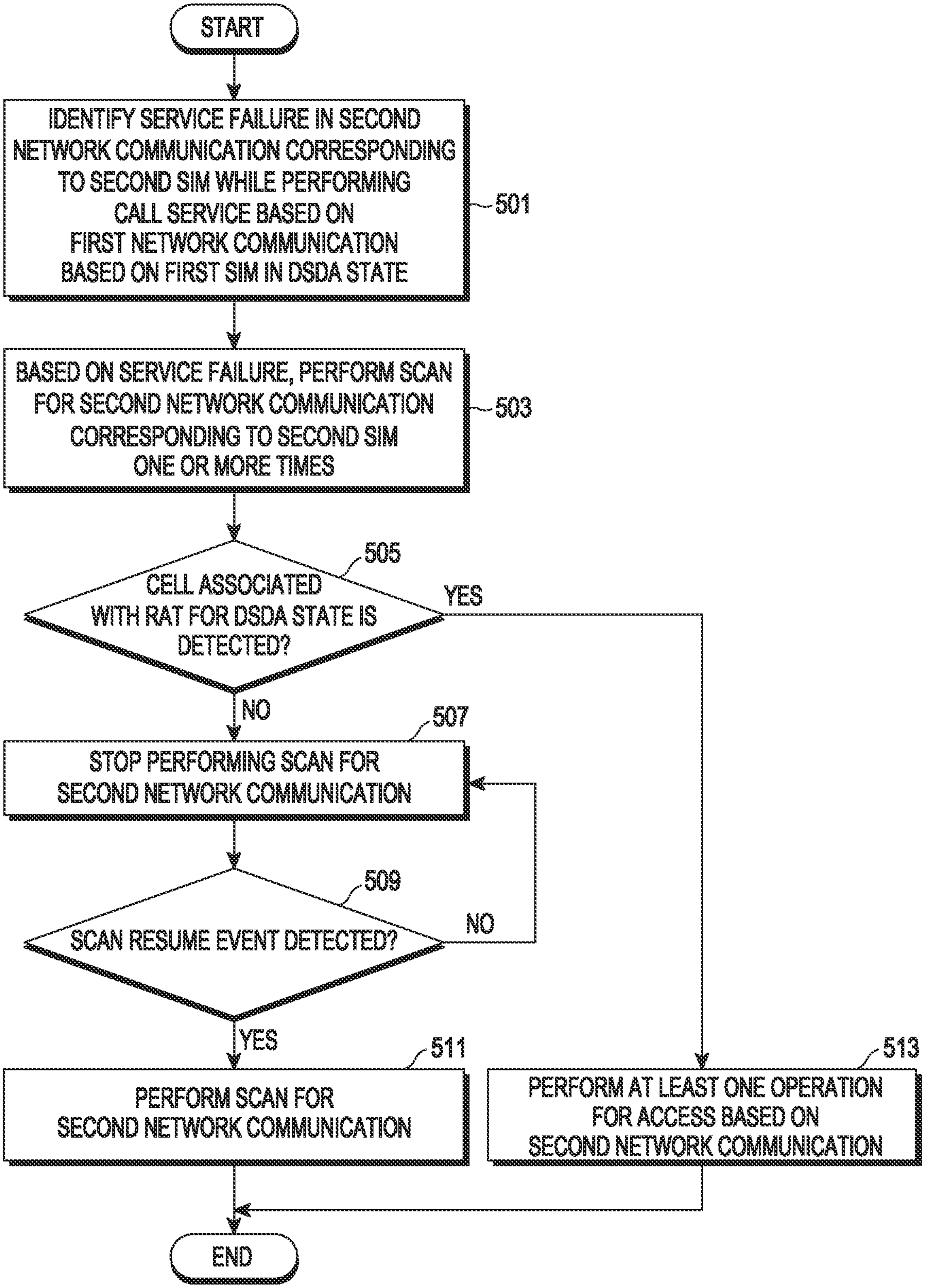
FIG. 5 is a flowchart illustrating an operation method of an electronic device according to an embodiment.

FIG. 5 is a flowchart illustrating an operation method of an electronic device according to an embodiment.

According to an embodiment, in operation 501, the electronic device 101 (e.g., at least one of the processor 120, the first communication processor 212, the second communication processor 214, or the integrated communication processor 260) may identify a service failure in the second network communication corresponding to the second SIM 112 while a call service based on the first network communication based on the first SIM 111 is performed in the DSDA state. Since the service failure identification method has been described above, and may not be repeated here.

In operation 503, the electronic device 101 may perform a scan for the second network communication corresponding to the second SIM 112 one or more times, based on the service failure.

In operation 505, the electronic device 101 may identify whether a cell associated with the RAT for the DSDA state is detected. For example, the electronic device 101 may identify whether a cell associated with the RAT for the DSDA state is detected, based on information about whether the DSDS state and/or the DSDA state is supported for a combination of RATs of a plurality of SIMs as shown in Table 1, but the method is not limited thereto. When a cell associated with the RAT for the DSDA state is detected (Yes in operation 505), the electronic device 101 may perform at least one operation for accessing based on the second network communication in operation 513. Accordingly, the electronic device 101 may operate in the DSDA state.

According to an embodiment, when the cell associated with the RAT for the DSDA state is not detected (No in operation 505), the electronic device 101 may stop the scan for the second network communication as at least part of the operation for restricting the scan for the second network communication in operation 507. After stopping the scan for the second network communication, the electronic device 101 may identify whether a scan resume event is detected in operation 509. If it is identified that the scan resume event is detected (Yes in operation 509), the electronic device 101 may perform (or resume) the scan for the second network communication in operation 511. If the scan resume event is not detected (No in operation 509), the electronic device 101 may maintain the scan stop for the second network communication.

For example, the electronic device 101 may detect information associated with the movement of the electronic device 101 meeting a designated condition as the scan resume event. For example, the information associated with the movement of the electronic device 101 may be identified based on sensing data from at least one sensor (e.g., a GPS sensor, an acceleration sensor, a gyro sensor, and/or a geomagnetic sensor, but there is no limitation on the type for sensing the movement and/or posture of the electronic device 101), but is not limited. Here, the designated condition may be, e.g., a condition in which the degree of movement of the electronic device 101 exceeds a designated threshold degree, but is not limited thereto. For example, when the user moves with the electronic device 101, there is a possibility that a cell for maintaining the DSDA state may be detected. Accordingly, the electronic device 101 may detect the condition in which the degree of movement exceeds a designated threshold degree as the scan resumption event. Meanwhile, it is merely an example that the information associated with the movement meets the designated condition, and the condition is not limited thereto. For example, the processor 120 (e.g., an application processor) may identify the scan resume event and provide the scan resume event to a communication processor (e.g., the first communication processor 212, the second communication processor 214, and/or the integrated communication processor 260). The communication processor may resume the scan based on the received scan resume event, but this is merely an example, and the operation of the application processor and/or the communication processor is not limited thereto.

For example, the electronic device 101 may detect a change of the cell of the first network communication corresponding to the first SIM 111 (e.g., handover and/or cell reselection, but is not limited thereto) as the scan resume event. For example, when the cell of the first network communication is changed, there may be a relatively high chance of the presence of a cell of the second network communication therearound. Accordingly, the electronic device 101 may resume the scan for the second network communication.

For example, the electronic device 101 may detect a signal from a neighboring cell of the first network communication meeting a designated condition, as the scan resume event. For example, when the reception strength of the signal of the neighboring cell is relatively large and/or when the reception strength of the signal of the neighboring cell is increased, it may mean that the location of the electronic device 101 is changed, and there may be a relatively high chance of the presence of a cell of the second network communication after the movement. Accordingly, the electronic device 101 may resume the scan for the second network communication.

For example, the electronic device 101 may detect expiration of the scan resume timer of the electronic device 101 as the scan resume event. For example, the scan resume timer may be started based on the scan stop. The expiration time of the scan resume timer may be set to be longer than, e.g., the scan period in the scan without limitation, but is not limited. The electronic device 101 may resume the scan for the second network communication based on the expiration of the scan resume timer.

Figure 6:
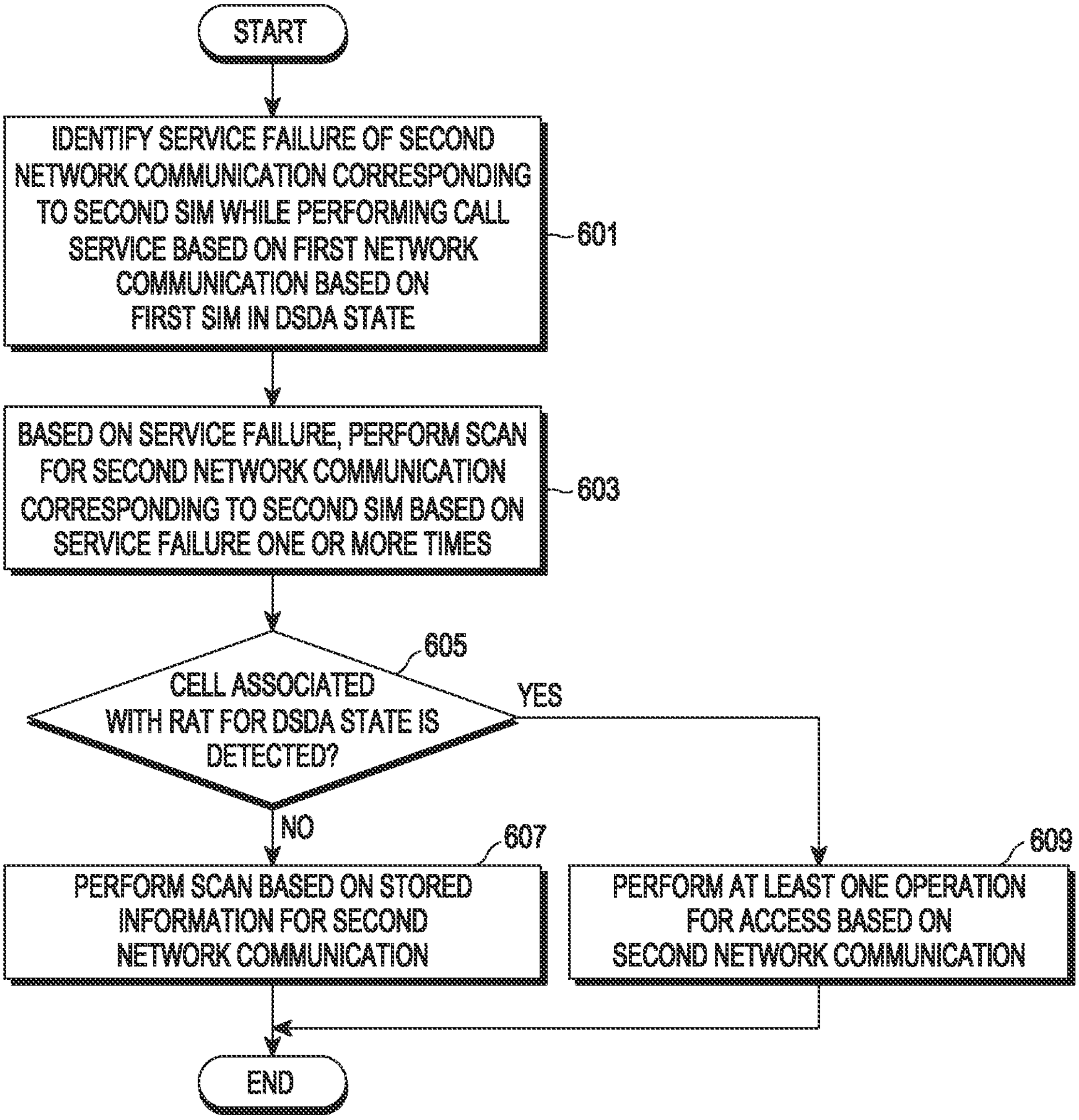
FIG. 6 is a flowchart illustrating an operation method of an electronic device according to an embodiment.

FIG. 6 is a flowchart illustrating an operation method of an electronic device according to an embodiment.

According to an embodiment, in operation 601, the electronic device 101 (e.g., at least one of the processor 120, the first communication processor 212, the second communication processor 214, or the integrated communication processor 260) may identify a service failure in the second network communication corresponding to the second SIM 112 while a call service based on the first network communication based on the first SIM 111 is performed in the DSDA state. Since the service failure identification method has been described above, and may not be repeated here.

In operation 603, the electronic device 101 may perform a scan for the second network communication corresponding to the second SIM 112 one or more times, based on the service failure.

In operation 605, the electronic device 101 may identify whether a cell associated with the RAT for the DSDA state is detected. For example, the electronic device 101 may identify whether a cell associated with the RAT for the DSDA state is detected, based on information about whether the DSDS state and/or the DSDA state is supported for a combination of RATs of a plurality of SIMs as shown in Table 1, but the method is not limited thereto. When a cell associated with the RAT for the DSDA state is detected (Yes in operation 605), the electronic device 101 may perform at least one operation for accessing based on the second network communication in operation 609. Accordingly, the electronic device 101 may operate in the DSDA state.

According to an embodiment, when the cell associated with the RAT for the DSDA state is not detected (No in operation 605), the electronic device 101 may perform a scan based on the information stored for the second network communication as an operation for scan restriction in operation 607. For example, if the unrestricted scan includes a recovery scan, a scan based on stored information, and a full scan, an operation for restricting the scan may be implemented to include only the scan based on the stored information, but the type of the scan is not limited. The electronic device 101 may perform a scan based on stored information as the operation for restricting the scan. The electronic device 101 may perform a scan based on all or some of the stored information as the operation for restricting the scan.

Figure 7:
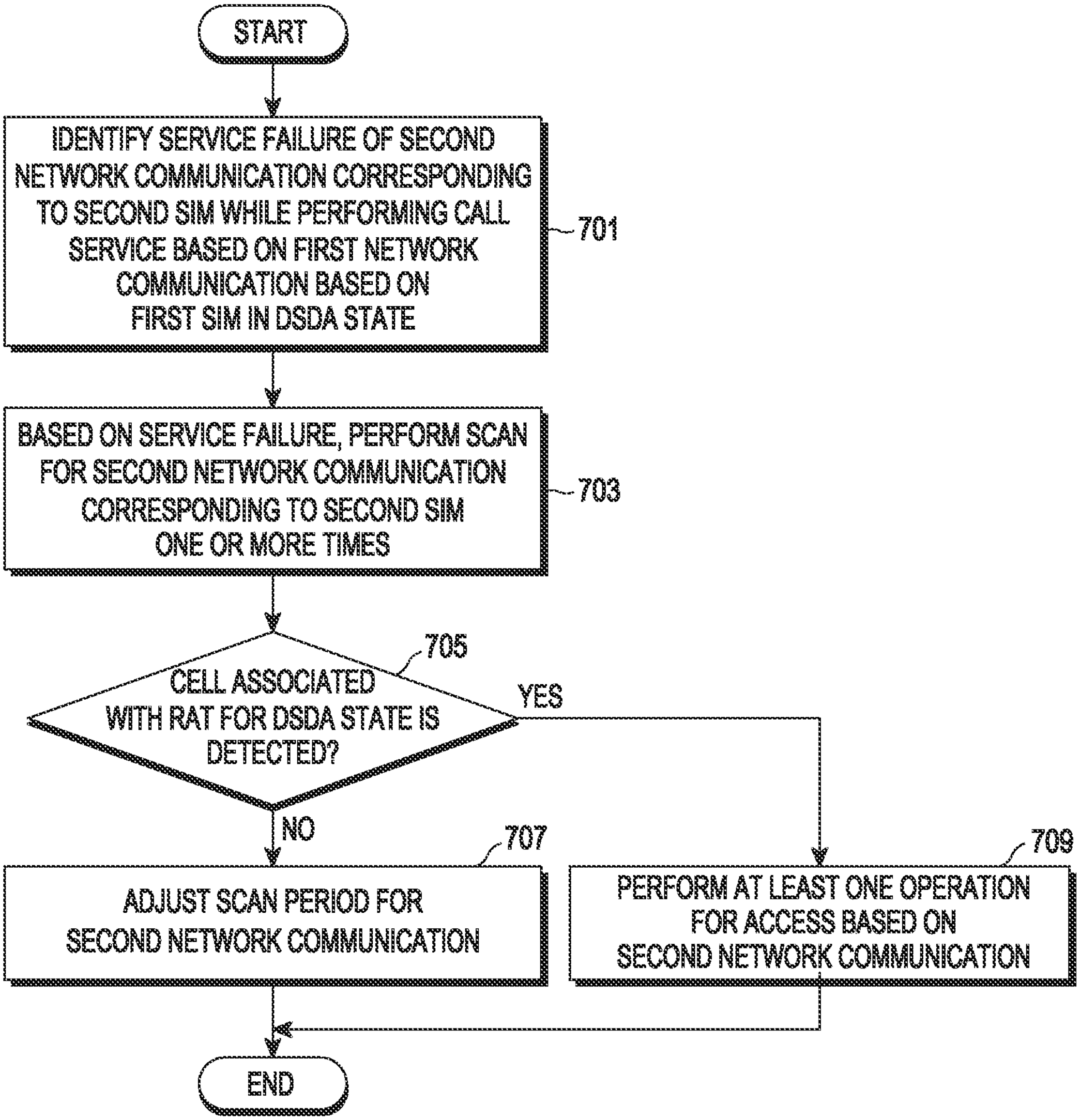
FIG. 7 is a flowchart illustrating an operation method of an electronic device according to an embodiment.

FIG. 7 is a flowchart illustrating an operation method of an electronic device according to an embodiment.

According to an embodiment, in operation 701, the electronic device 101 (e.g., at least one of the processor 120, the first communication processor 212, the second communication processor 214, or the integrated communication processor 260) may identify a service failure in the second network communication corresponding to the second SIM 112 while a call service based on the first network communication based on the first SIM 111 is performed in the DSDA state. Since the service failure identification method has been described above, and may not be repeated here.

In operation 703, the electronic device 101 may perform a scan for the second network communication corresponding to the second SIM 112 one or more times, based on the service failure.

In operation 705, the electronic device 101 may identify whether a cell associated with the RAT for the DSDA state is detected. For example, the electronic device 101 may identify whether a cell associated with the RAT for the DSDA state is detected, based on information about whether the DSDS state and/or the DSDA state is supported for a combination of RATs of a plurality of SIMs as shown in Table 1, but the method is not limited thereto. When a cell associated with the RAT for the DSDA state is detected (Yes in operation 705), the electronic device 101 may perform at least one operation for access based on the second network communication in operation 709. Accordingly, the electronic device 101 may operate in the DSDA state.

According to an embodiment, when the cell associated with the RAT for the DSDA state is not detected (No in operation 705), the electronic device 101 may perform adjustment of the scan period for the second network communication as an operation for scan restriction in operation 707. For example, if the period of unrestricted scan (e.g., scan in operation 703) is a first period, the period of restricted scan (e.g., scan in operation 707) may be a second period longer than the first period.

Figure 8:
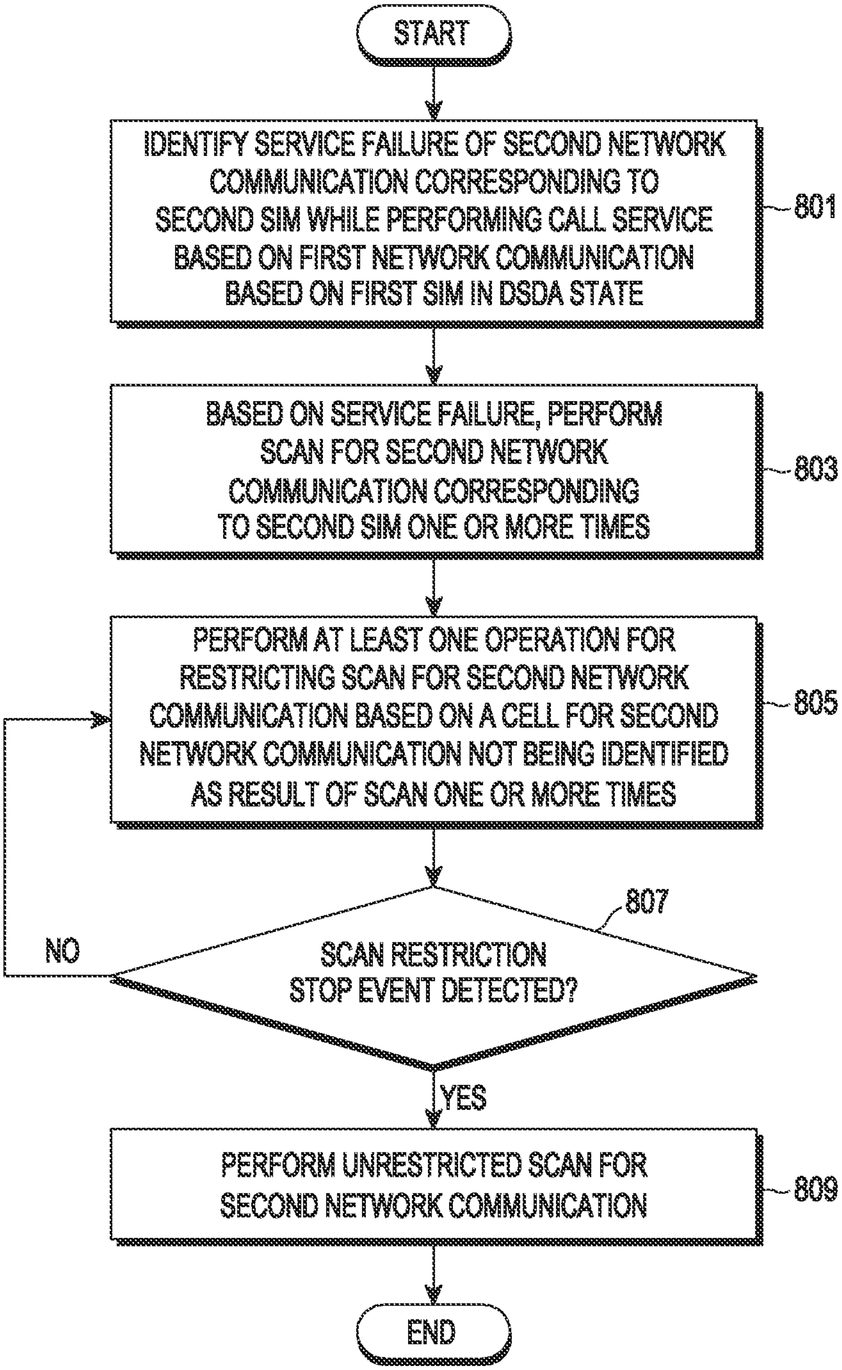
FIG. 8 is a flowchart illustrating an operation method of an electronic device according to an embodiment.

FIG. 8 is a flowchart illustrating an operation method of an electronic device according to an embodiment.

According to an embodiment, in operation 801, the electronic device 101 (e.g., at least one of the processor 120, the first communication processor 212, the second communication processor 214, or the integrated communication processor 260) may identify a service failure in the second network communication corresponding to the second SIM 112 while a call service based on the first network communication based on the first SIM 111 is performed in the DSDA state. Since the service failure identification method has been described above, and may not be repeated here.

In operation 803, the electronic device 101 may perform a scan for the second network communication corresponding to the second SIM 112 one or more times, based on the service failure.

In operation 805, the electronic device 101 may perform at least one operation for restricting the scan for the second network communication, based on a cell for the second network communication not being identified as a result of a scan one or more times. The at least one operation for restricting the scan may include, e.g., an operation described based on FIG. 5, FIG. 6, and/or FIG. 7, but is not limited thereto.

According to an embodiment, in operation 807, the electronic device 101 may identify whether a scan restriction stop event is detected. When the scan restriction stop event is not detected (No in operation 807), the electronic device 101 may maintain the scan restriction. When the scan restriction stop event is detected (Yes in operation 807), the electronic device 101 may stop the scan restriction and, in operation 809, may perform an unrestricted scan for the second network communication (which may also be referred to as a restriction-mitigated scan or pause of the operation for restriction).

For example, the scan restriction stop event may include the expiration of the timer for stopping the scan restriction. For example, the timer for stopping the scan restriction may be started based on performing at least one operation for restricting the scan as in operation 805. Based on the expiration of the timer for stopping the scan restriction, the electronic device 101 may stop the scan restriction and perform an unrestricted scan for the second network communication.

For example, the scan restriction stop event may include that information associated with the movement of the electronic device 101 meets a designated condition. For example, the information associated with the movement of the electronic device 101 may be identified based on sensing data from at least one sensor (e.g., a GPS sensor, an acceleration sensor, a gyro sensor, and/or a geomagnetic sensor, but there is no limitation on the type for sensing the movement and/or posture of the electronic device 101), but is not limited. For example, the designated condition may be, e.g., a condition in which the degree of movement of the electronic device 101 exceeds a designated threshold degree, but is not limited thereto. For example, when the user moves with the electronic device 101, there is a possibility that a cell for maintaining the DSDA state may be detected. Accordingly, the electronic device 101 may detect the condition in which the degree of movement exceeds a designated threshold degree as the scan restriction stop event. Meanwhile, it is merely an example that the information associated with the movement meets the designated condition, and the condition is not limited thereto. For example, the processor 120 (e.g., an application processor) may identify the scan restriction stop event and provide the scan restriction stop event to a communication processor (e.g., the first communication processor 212, the second communication processor 214, and/or the integrated communication processor 260). The communication processor may resume the scan based on the received scan restriction stop event, but this is merely an example, and the operation of the application processor and/or the communication processor is not limited thereto.

For example, the scan restriction stop event may be a change of a cell of the first network communication corresponding to the first SIM 111 (e.g., handover and/or cell reselection, but there is no restriction). For example, when the cell of the first network communication is changed, there may be a relatively high chance of the presence of a cell of the second network communication therearound. Accordingly, the electronic device 101 may stop the scan restriction of the second network communication.

For example, the scan restriction stop event may include that a signal from a neighboring cell of the first network communication meets a designated condition. For example, when the reception strength of the signal of the neighboring cell is relatively large and/or when the reception strength of the signal of the neighboring cell is increased, it may mean that the location of the electronic device 101 is changed, and there may be a relatively high chance of the presence of a cell of the second network communication after the movement. Accordingly, the electronic device 101 may stop the scan restriction for the second network communication.

Figure 9:
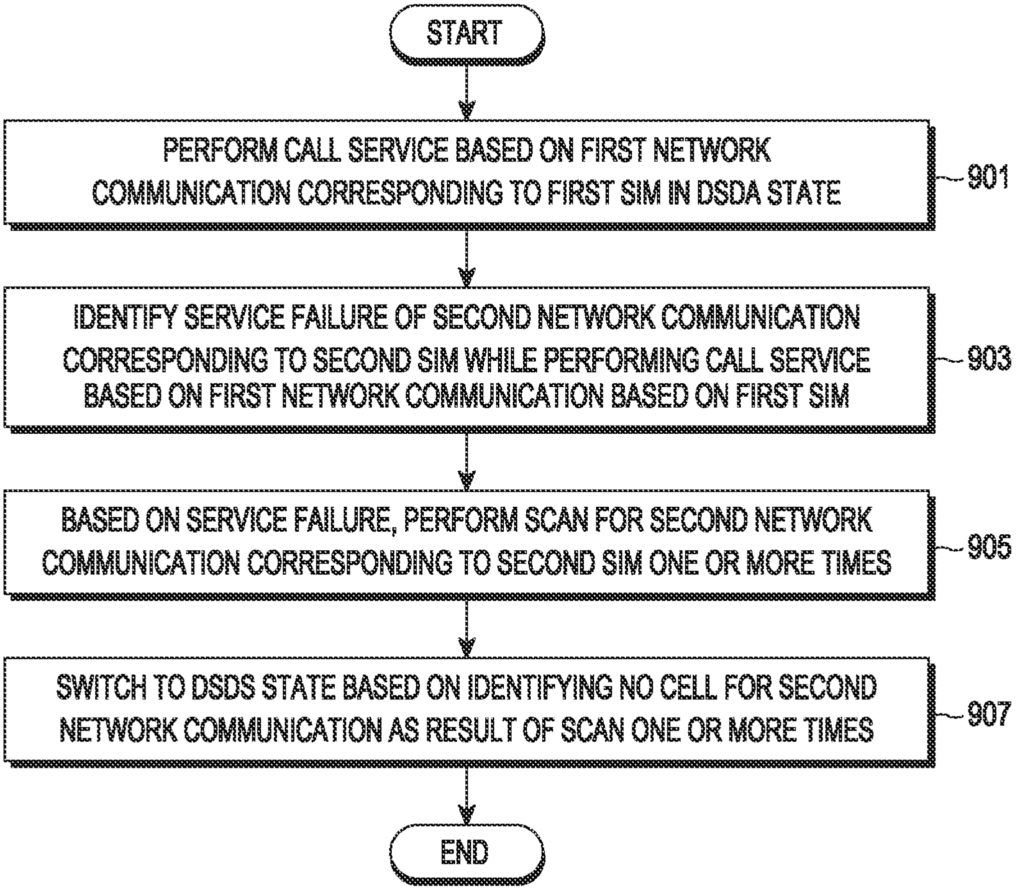
FIG. 9 is a flowchart illustrating an operation method of an electronic device according to an embodiment.
Figure 10A:
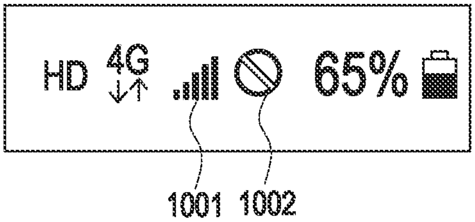
FIGS. 10A, 10B, and 10C may illustrate at least a portion of a screen provided by an electronic device according to embodiments.
Figure 10B:
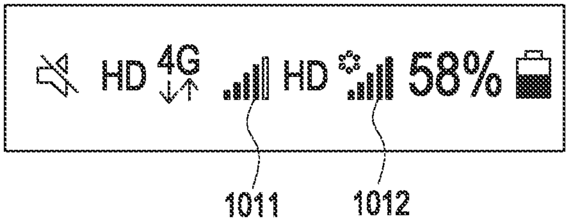
Figure 10C:
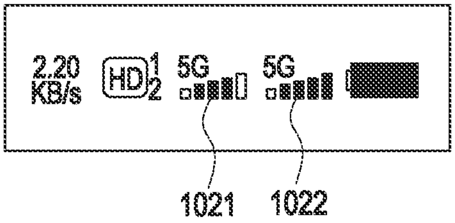

FIG. 9 is a flowchart illustrating an operation method of an electronic device according to an embodiment. The embodiment of FIG. 9 is described with reference to FIGS. 10A, 10B and 10C (which may be referred to as FIGS. 10A to 10C). FIGS. 10A to 10C may illustrate at least a portion of a screen provided by an electronic device according to various embodiments.

According to an embodiment, the electronic device 101 (e.g., at least one of the processor 120, the first communication processor 212, the second communication processor 214, or the integrated communication processor 260) may perform a call service based on the first network communication corresponding to the first SIM 111 in the DSDA state in operation 901.

In operation 903, the electronic device 101 may identify a service failure in the second network communication corresponding to the second SIM 112 while the call service based on the first network communication based on the first SIM 111 is being performed.

In operation 905, the electronic device 101 may perform a scan for the second network communication corresponding to the second SIM 112 one or more times, based on the service failure.

In operation 907, the electronic device 101 may switch to the DSDS state based on a cell for the second network communication not being identified as a result of a scan one or more times. According to switching to the DSDS state, the electronic device 101 may perform the first network communication and the second network communication in the DSDS state. For example, the electronic device 101 may perform the first network communication based on the first RF path for the first network communication and then may, or may not, perform a scan for the second network communication for a predetermined period. During the period, the second RF path allocated for the second network communication corresponding to the second SIM 112 in the previous DSDA state may not be used, and unnecessary power consumption may be prevented and/or reduced.

For example, as shown in FIG. 10C, the electronic device 101 may display a first indicator 1021 associated with the first network communication corresponding to the first SIM 111 and a second indicator 1022 associated with the second network communication in the DSDA state. The first indicator 1021 may be expressed, e.g., in a shape (e.g., a shape of a plurality of bars) visually indicating the reception strength of the first network communication, but is not limited thereto. The second indicator 1022 may be expressed, e.g., in a shape (e.g., a shape of a plurality of bars) visually indicating the reception strength of the second network communication, but is not limited thereto. For example, in the DSDA state, the first indicator 1021 associated with the first network communication and the second indicator 1022 associated with the second network communication may be displayed together. For example, the first indicator 1021 and the second indicator 1022 may indicate reception strength (which may also be referred to as quality goodness or electric field strength) of the first network communication and the second network communication, but are not limited thereto.

For example, as shown in FIG. 10A, the electronic device 101 may display a first indicator 1001 associated with the first network communication corresponding to the first SIM 111 and a third indicator 1002 associated with the service failure in the second network communication corresponding to the second SIM 112 together in the DSDA state. For example, the electronic device 101 may display the third indicator 1002 based on identifying the service failure in the second network communication in operation 903. For example, the third indicator 1002 may indicate a service failure, but is not limited thereto.

For example, as shown in FIG. 10B, the electronic device 101 may display a first indicator 1011 associated with the first network communication corresponding to the first SIM 111 and a fourth indicator 1012 associated with the second network communication corresponding to the second SIM 112 together in the DSDS state. For example, the first indicator 1011 may be displayed corresponding to the first SIM 111 which is a DDS, and the second indicator 1012 may be displayed corresponding to the second SIM 112 which is a non-DDS. For example, the electronic device 101 may display the fourth indicator 1012 based on the switching to the DSDS state in operation 907. For example, the first indicator 1011 may indicate the reception strength (which may also be referred to as quality goodness or electric field strength) of the first network communication, but is not limited thereto. For example, the fourth indicator 1012 may indicate that the second network communication is in the standby state according to the DSDS mode, but is not limited thereto.

The fourth indicator 1012 may indicate the reception strength (which may also be referred to as quality goodness or electric field strength) of the second network communication, but is not limited thereto. For example, the electronic device 101 may display the fourth indicator 1012 even in the DSDA state. For example, as described above, the electronic device 101 may identify a service failure in the second network communication corresponding to the second SIM 112 while performing the call service based on the first network communication corresponding to the first SIM 111. The electronic device 101 may perform at least one operation for restricting the scan of the second network communication, based on a service failure and/or a failure in cell detection of the scan result based on a service failure. The electronic device 101 may display the fourth indicator 1012 based on performing at least one operation for restricting the scan of the second network communication.

Figure 11:
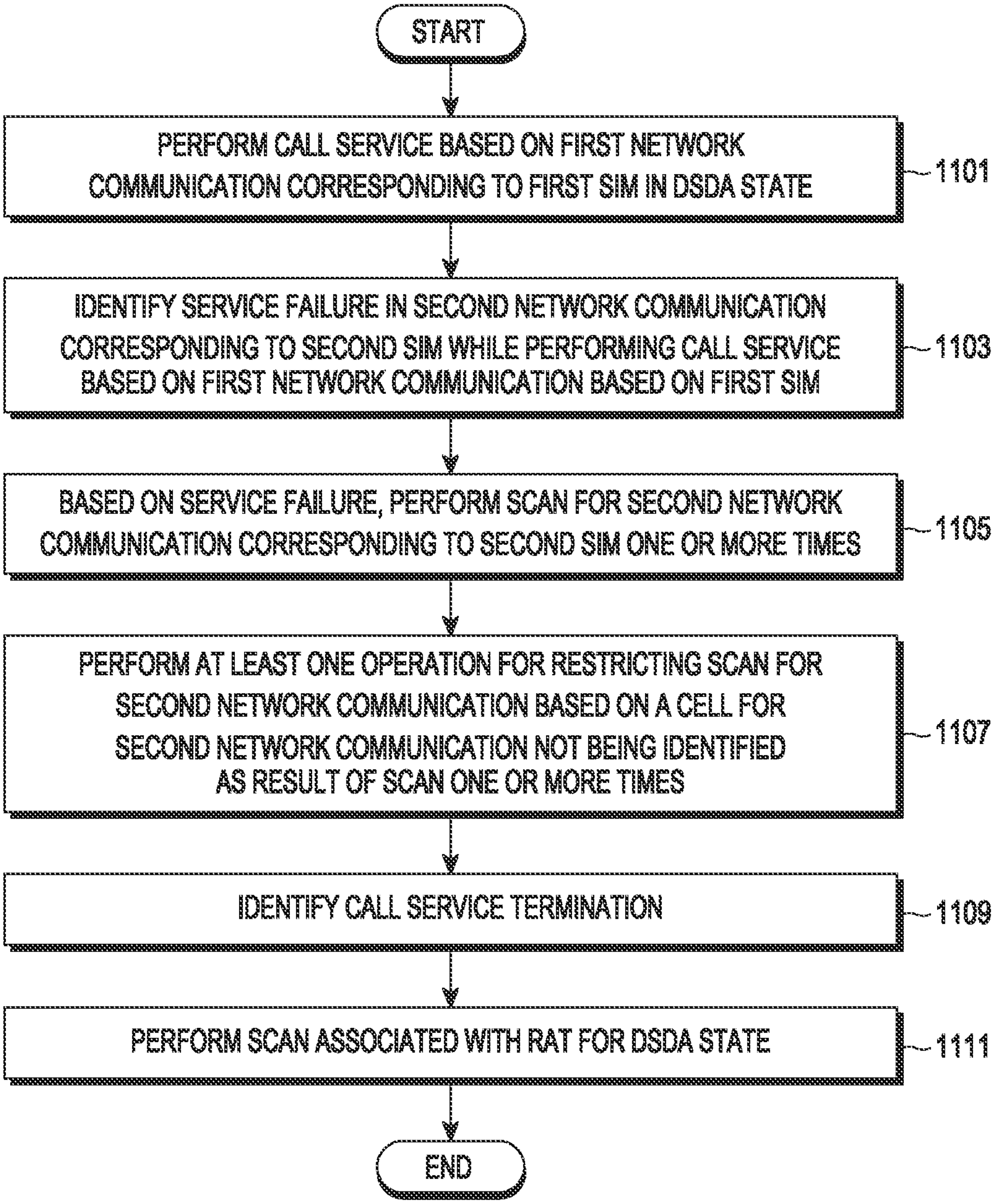
FIG. 11 is a flowchart illustrating an operation method of an electronic device according to an embodiment.

FIG. 11 is a flowchart illustrating an operation method of an electronic device according to an embodiment.

According to an embodiment, the electronic device 101 (e.g., at least one of the processor 120, the first communication processor 212, the second communication processor 214, or the integrated communication processor 260) may perform a call service based on the first network communication corresponding to the first SIM 111 in the DSDA state in operation 1101.

In operation 1103, the electronic device 101 may identify a service failure in the second network communication corresponding to the second SIM 112 while the call service based on the first network communication based on the first SIM 111 is being performed.

In operation 1105, the electronic device 101 may perform a scan for the second network communication corresponding to the second SIM 112 one or more times, based on the service failure.

In operation 1107, the electronic device 101 may perform at least one operation for restricting the scan for the second network communication, based on identifying no cell for the second network communication as a result of a scan one or more times.

In operation 1109, the electronic device 101 may identify termination of the call service based on the first network communication corresponding to the first SIM 111. The electronic device 101 may perform a scan based on the second network communication corresponding to the second SIM 112, based on the call service termination based on the first network communication. The electronic device 101 may perform a scan associated with the RAT for the DSDA state, e.g., as in operation 1111. For example, as shown in Table 1, there may be a combination (e.g., LTE/LTE combination) that does not support the DSDA state among combinations of RATs. In order to relatively quickly enter the DSDA state, the electronic device 101 may perform a scan associated with the RAT for supporting the DSDA state, prior to the RAT for supporting only the DSDS state, as in operation 1111. For example, it is assumed that the first network communication corresponding to the first SIM 111 is LTE. As shown in Table 1, when the first network communication is LTE, the RAT supporting the DSDA state may be sub6 SA, and LTE may not support the DSDA state. Based on termination of the call service based on the first network communication, the electronic device 101 may perform a scan associated with sub6 SA, as the scan for the second network communication, prior to, e.g., a scan associated with LTE. Alternatively, the electronic device 101 may be implemented to perform a scan associated with sub6 SA supporting the DSDA state and not to perform a scan associated with LTE not supporting the DSDA state. Accordingly, the electronic device 101 may relatively quickly enter the DSDA state based on stopping the call service based on the first network communication corresponding to the first SIM 111.

Figure 12:
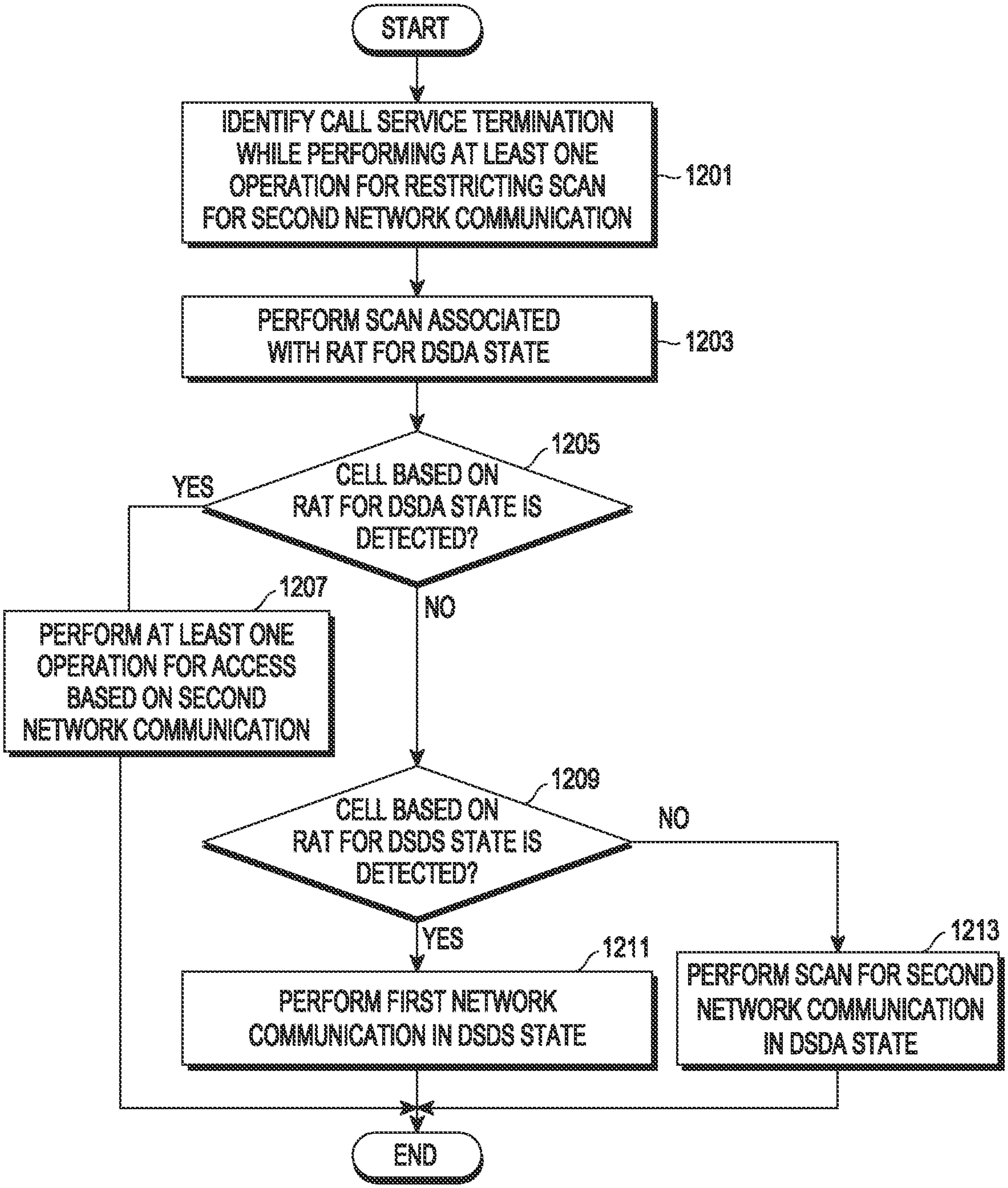
FIG. 12 is a flowchart illustrating an operation method of an electronic device according to an embodiment.

FIG. 12 is a flowchart illustrating an operation method of an electronic device according to an embodiment.

According to an embodiment, in operation 1201, the electronic device 101 (e.g., at least one of the processor 120, the first communication processor 212, the second communication processor 214, or the integrated communication processor 260) may identify termination of a call service based on the first network communication corresponding to the first SIM 111 while performing at least one operation for restricting the scan for the second network communication corresponding to the second SIM 112.

In operation 1203, the electronic device 101 may perform a scan associated with the RAT for the DSDA state. As described above, the electronic device 101 may first perform the scan associated with the RAT for the DSDA state.

In operation 1205, the electronic device 101 may identify whether a cell based on the RAT for the DSDA state is detected. When a cell based on the RAT for the DSDA state is detected (Yes in operation 1205), the electronic device 101 may perform at least one operation for accessing based on the second network communication in operation 1207. Accordingly, the electronic device 101 may perform the first network communication and the second network communication in the DSDA state.

According to an embodiment, when the cell based on the RAT for the DSDA state is not detected (No in operation 1205), the electronic device 101 may identify whether the cell based on the RAT for the DSDS state is detected in operation 1209. For example, it is assumed that the first network communication corresponding to the first SIM 111 is LTE. As shown in Table 1, when the first network communication is LTE, the RAT supporting the DSDA state may be sub6 SA, and LTE may not support the DSDA state. Based on termination of the call service based on the first network communication, the electronic device 101 may perform a scan associated with sub6 SA, as the scan for the second network communication, as in, e.g., operation 1203, prior to, e.g., a scan associated with LTE. When the cell based on the RAT for the DSDA state is not detected, in operation 1209, a scan based on LTE and/or sub6 SA supporting the DSDS state may be performed. If a cell based on the RAT for the DSDS state is detected (Yes in operation 1209), the electronic device 101 may perform first network communication in the DSDS state in operation 1211. For example, the electronic device 101 may perform the first network communication based on the first RF path for the first network communication and then may, or may not, perform a scan for the second network communication for a predetermined period. If the cell based on the RAT for the DSDS state is not detected (No in operation 1209), the electronic device 101 may perform the scan for the second network communication in the DSDA state in operation 1213, but this is merely an example and is not limited thereto.

According to an embodiment, an electronic device may comprise memory and at least one processor, comprising processing circuitry. The memory may store at least one instruction that, when executed by at least one processor, individually and/or collectively, may cause the electronic device to: perform a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identify a service failure in the second network communication corresponding to the second SIM while performing the call service based on the first network communication based on the first SIM; based on the service failure, perform a scan for the second network communication corresponding to the second SIM one or more times; and perform at least one operation for restricting the scan for the second network communication based on a cell for the second network communication not being identified as a result of the scan one or more times.

According to an embodiment, the at least one instruction, when executed by at least one processor, individually and/or collectively, may cause the electronic device to, as at least part of performing the at least one operation for restricting the scan for the second network communication based on a cell for the second network communication not being identified as the result of the scan one or more times, stop the scan for the second network communication.

According to an example embodiment, the at least one instruction, when executed by at least one processor, individually and/or collectively, may cause the electronic device to identify a scan resume event after stopping the scan for the second network communication; and resuming the scan for the second network communication based on the scan resume event.

According to an example embodiment, the scan resume event may be generated based on sensing data from at least one sensor associated with a movement of the electronic device meeting a designated condition.

According to an example embodiment, the at least one instruction, when executed by at least one processor, individually and/or collectively, may cause the electronic device to, as at least part of performing the at least one operation for restricting the scan for the second network communication based on a cell for the second network communication not being identified as the result of the scan one or more times, adjust a period of the scan for the second network communication.

According to an example embodiment, the at least one instruction, when executed by at least one processor, individually and/or collectively, may cause the electronic device to, as at least part of performing the at least one operation for restricting the scan for the second network communication based on a cell for the second network communication not being identified as the result of the scan one or more times, perform only a portion of a plurality of types of the scan for the second network communication.

According to an example embodiment, the at least one instruction, when executed by at least one processor, individually and/or collectively, may cause the electronic device to, as at least part of performing only a portion of the plurality of types of the scan for the second network communication, perform the scan based on information for the second network communication stored in the memory.

According to an example embodiment, the at least one instruction, when executed by at least one processor, individually and/or collectively, may cause the electronic device to stop performing the at least one operation for restricting the scan for the second network communication and perform an unrestricted scan for the second network communication based on identifying a scan restriction stop event.

According to an example embodiment, the at least one instruction, when executed by at least one processor, individually and/or collectively, may cause the electronic device to identify that the call service based on the first network communication based on the first SIM is terminated while performing the at least one operation for restricting the scan for the second network communication; and perform a first scan associated with the second SIM associated with an RAT capable of a dual-SIM dual-active (DSDA) state with the first network communication corresponding to the first SIM based on identifying that the call service is terminated.

According to an embodiment, the at least one instruction, when executed by at least one processor, individually and/or collectively, may cause the electronic device to, based on a scan associated with the second SIM associated with the RAT capable of the DSDA state, perform at least one operation for accessing the identified cell; based on a cell not being identified based on the first scan associated with the second SIM associated with the RAT capable of the DSDA state, perform a second scan associated with the second SIM associated with the RAT capable of a DSDS state with the first network communication corresponding to the first SIM.

According to an embodiment, in a non-transitory computer-readable storage medium storing at least one computer-readable instruction, the at least one instruction may, when executed by at least one processor, individually and/or collectively, of an electronic device, cause the electronic device to perform at least one operation, comprising: performing a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identifying a service failure in the second network communication corresponding to the second SIM while performing the call service based on the first network communication based on the first SIM; based on the service failure, performing a scan for the second network communication corresponding to the second SIM one or more times; and restricting the scan for the second network communication based on a cell for the second network communication not being identified as a result of the scan one or more times.

According to an embodiment, performing the at least one operation for restricting the scan for the second network communication based on a cell for the second network communication not being identified as the result of the scan one or more times may comprise stopping the scan for the second network communication.

According to an embodiment, the at least one operation may comprise: identifying a scan resume event after stopping the scan for the second network communication; and resuming the scan for the second network communication based on the scan resume event.

According to an embodiment, the scan resume event may be generated based on sensing data from at least one sensor associated with a movement of the electronic device meeting a designated condition.

According to an embodiment, performing the at least one operation for restricting the scan for the second network communication based on a cell for the second network communication not being identified as the result of the scan one or more times may comprise adjusting a period of the scan for the second network communication.

According to an embodiment, performing the at least one operation for restricting the scan for the second network communication based on a cell for the second network communication not being identified as the result of the scan one or more times may comprise performing only a portion of a plurality of types of the scan for the second network communication.

According to an embodiment, performing only the portion of the plurality of types of the scan for the second network communication may comprise performing the scan based on information for the second network communication stored in the memory.

According to an embodiment, the at least one operation may further comprise: stopping performing the at least one operation for restricting the scan for the second network communication and performing an unrestricted scan for the second network communication based on identifying a scan restriction stop event.

According to an embodiment, the at least one operation may comprise: identifying that the call service based on the first network communication based on the first SIM is terminated while performing the at least one operation for restricting the scan for the second network communication; and performing a first scan associated with the second SIM associated with an RAT capable of a dual-SIM dual-active (DSDA) state with the first network communication corresponding to the first SIM based on identifying that the call service is terminated.

According to an embodiment, a method for operating an electronic device may comprise: performing a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identifying a service failure in the second network communication corresponding to the second SIM while performing the call service based on the first network communication based on the first SIM; based on the service failure, performing a scan for the second network communication corresponding to the second SIM one or more times; and performing at least one operation for restricting the scan for the second network communication based on a cell for the second network communication not being identified as a result of the scan one or more times.

According to an embodiment, an electronic device may comprise memory and at least one processor, comprising processing circuitry. The memory may store at least one instruction that, when executed by at least one processor, individually and/or collectively, may cause the electronic device to: perform a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identify a service failure in the second network communication corresponding to the second SIM while performing the call service based on the first network communication based on the first SIM; based on the service failure, perform a scan for the second network communication corresponding to the second SIM one or more times; enter a dual-SIM dual active (DSDS) state of allocating a third portion of the RF resources of the electronic device for the first network communication and the second network communication based on a cell for the second network communication not being identified as a result of the scan one or more times.

According to an embodiment, in a non-transitory computer-readable storage medium storing at least one computer-readable instruction, the at least one instruction may, when executed by at least one processor, individually and/or collectively, of an electronic device, may cause the electronic device to perform at least one operation, comprising: performing a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identifying a service failure in the second network communication corresponding to the second SIM while performing the call service based on the first network communication based on the first SIM; based on the service failure, performing a scan for the second network communication corresponding to the second SIM one or more times; entering a dual-SIM dual-active (DSDS) state of allocating a third portion of the RF resources of the electronic device for the first network communication and the second network communication based on a cell for the second network communication not being identified as a result of the scan one or more times.

According to an embodiment, a method for operating an electronic device may comprise: performing a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM; identifying a service failure in the second network communication corresponding to the second SIM while performing the call service based on the first network communication based on the first SIM; based on the service failure, performing a scan for the second network communication corresponding to the second SIM one or more times; entering a dual-SIM dual-active (DSDS) state of allocating a third portion of the RF resources of the electronic device for the first network communication and the second network communication based on a cell for the second network communication not being identified as a result of the scan one or more times.

The electronic device according to an embodiment may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or Further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

memory storing instructions; and at least one processor, comprising processing circuitry;

wherein the instructions, when executed by at least one processor, individually and/or collectively, cause the electronic device to:

perform a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM;

identify a service failure in the second network communication corresponding to the second SIM while performing the call service based on the first network communication based on the first SIM;

based on the service failure, perform a scan for the second network communication corresponding to the second SIM one or more times; and perform at least one operation for restricting the scan for the second network communication based on a cell for the second network communication not being identified as a result of the scan one or more times.

2. The electronic device of claim 1, wherein the instructions, when executed by at least one processor, individually and/or collectively, cause the electronic device to:

as at least part of performing the at least one operation for restricting the scan for the second network communication based on a cell for the second network communication not being identified as the result of the scan one or more times, stop the scan for the second network communication.

3. The electronic device of claim 2, wherein the instructions, when executed by at least one processor, individually and/or collectively, cause the electronic device to:

identify a scan resume event after stopping the scan for the second network communication; and resume the scan for the second network communication based on the scan resume event.

4. The electronic device of claim 3, wherein the scan resume event is generated based on sensing data from at least one sensor associated with a movement of the electronic device meeting a designated condition.

5. The electronic device of claim 1, wherein the instructions, when executed by at least one processor, individually and/or collectively, cause the electronic device to:

as at least part of performing the at least one operation for restricting the scan for the second network communication based on a cell for the second network communication not being identified as the result of the scan one or more times, adjust a period of the scan of the second network communication.

6. The electronic device of claim 1, wherein the instructions, when executed by at least one processor, individually and/or collectively, cause the electronic device to:

as at least part of performing the at least one operation for restricting the scan for the second network communication based on a cell for the second network communication not being identified as the result of the scan one or more times, perform only a portion of a plurality of types of the scan for the second network communication.

7. The electronic device of claim 6, wherein the instructions, when executed by at least one processor, individually and/or collectively, cause the electronic device to:

as at least part of performing only a portion of the plurality of types of the scan for the second network communication, perform the scan based on information for the second network communication stored in the memory.

8. The electronic device of claim 1, wherein the instructions, when executed by at least one processor, individually and/or collectively, cause the electronic device to:

stop performing the at least one operation for restricting the scan for the second network communication and perform an unrestricted scan for the second network communication based on identifying a scan restriction stop event.

9. The electronic device of claim 1, wherein the instructions, when executed by at least one processor, individually and/or collectively, cause the electronic device to:

identify that the call service based on the first network communication based on the first SIM being terminated while performing the at least one operation for restricting the scan for the second network communication; and perform a first scan associated with the second SIM associated with a radio access technology (RAT) capable of a dual-SIM dual-active (DSDA) state with the first network communication corresponding to the first SIM based on identifying that the call service is terminated.

10. The electronic device of claim 1, wherein the instructions, when executed by at least one processor, individually and/or collectively, cause the electronic device to:

based on identifying a cell based on the first scan associated with the second SIM associated with a radio access technology (RAT) capable of a dual-SIM dual-active (DSDA) state, perform at least one operation for accessing the identified cell; and based on the cell not being identified based on the first scan associated with the second SIM associated with the RAT capable of the DSDA state, perform a second scan associated with the second SIM associated with the RAT capable of a dual-SIM dual-active (DSDS) state with the first network communication corresponding to the first SIM.

11. A non-transitory computer-readable storage medium storing at least one computer-readable instruction, the at least one instruction, when executed by at least one processor, individually and/or collectively, of an electronic device, causes the electronic device to perform at least one operation, comprising:

performing a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM;

identifying a service failure in the second network communication corresponding to the second SIM while performing the call service based on the first network communication based on the first SIM;

based on the service failure, performing a scan for the second network communication corresponding to the second SIM one or more times; and performing at least one operation for restricting the scan for the second network communication based on a cell for the second network communication not being identified as a result of the scan one or more times.

12. The non-transitory computer-readable storage medium of claim 11, wherein performing the at least one operation for restricting the scan for the second network communication based on a cell for the second network communication not being identified as the result of the scan one or more times comprises stopping the scan for the second network communication.

13. The non-transitory computer-readable storage medium of claim 12, wherein the at least one operation comprises:

identifying a scan resume event after stopping the scan for the second network communication; and resuming the scan for the second network communication based on the scan resume event.

14. The non-transitory computer-readable storage medium of claim 13, wherein the scan resume event is generated based on sensing data from at least one sensor associated with a movement of the electronic device meeting a designated condition.

15. The non-transitory computer-readable storage medium of claim 11, wherein performing the at least one operation for restricting the scan for the second network communication based on a cell for the second network communication not being identified as the result of the scan one or more times comprises adjusting a period of the scan for the second network communication.

16. The non-transitory computer-readable storage medium of claim 11, wherein performing the at least one operation for restricting the scan for the second network communication based on a cell for the second network communication not being identified as the result of the scan one or more times comprises performing only a portion of a plurality of types of the scan for the second network communication.

17. The non-transitory computer-readable storage medium of claim 16, wherein performing only the portion of the plurality of types of the scan for the second network communication comprises performing the scan based on information for the second network communication stored in the memory.

18. The non-transitory computer-readable storage medium of claim 11, wherein the at least one operation further comprises stopping performing the at least one operation for restricting the scan for the second network communication and performing an unrestricted scan for the second network communication based on identifying a scan restriction stop event.

19. The non-transitory computer-readable storage medium of claim 11, wherein the at least one operation further comprises:

identifying that the call service based on the first network communication based on the first SIM is terminated while performing the at least one operation for restricting the scan for the second network communication; and performing a first scan associated with the second SIM associated with a radio access technology (RAT) capable of a dual-SIM dual-active (DSDA) state with the first network communication corresponding to the first SIM based on identifying that the call service is terminated.

20. An electronic device comprising:

memory storing instructions; and at least one processor, comprising processing circuitry;

wherein the instructions, when executed by at least one processor, individually and/or collectively, cause the electronic device to:

perform a call service based on a first network communication corresponding to a first subscriber identification module (SIM) in a state in which a first portion of RF resources of the electronic device is allocated for the first network communication corresponding to the first SIM, and a second portion, at least partially different from the first portion, of the RF resources is allocated for a second network communication corresponding to a second SIM different from the first SIM;

identify a service failure in the second network communication corresponding to the second SIM while performing the call service based on the first network communication based on the first SIM;

based on the service failure, perform a scan for the second network communication corresponding to the second SIM one or more times; and enter a dual-SIM dual-active (DSDS) state of allocating a third portion of the RF resources of the electronic device for the first network communication and the second network communication based on a cell for the second network communication not being identified as a result of the scan one or more times.

* * * * *